(12) United States Patent
Matsukawa et al.

(10) Patent No.: US 10,574,078 B2
(45) Date of Patent: Feb. 25, 2020

(54) CHARGING SYSTEM

(71) Applicant: Panasonic Intellectual Property Management Co., Ltd., Osaka (JP)

(72) Inventors: Yoshihiko Matsukawa, Nara (JP); Akira Kawamoto, Kyoto (JP); Hiroyuki Koda, Osaka (JP); Tatsuaki Amemura, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/300,178

(22) PCT Filed: May 22, 2017

(86) PCT No.: PCT/JP2017/018945
§ 371 (c)(1),
(2) Date: Nov. 9, 2018

(87) PCT Pub. No.: WO2017/204130
PCT Pub. Date: Nov. 30, 2017

(65) Prior Publication Data
US 2019/0181671 A1    Jun. 13, 2019

(30) Foreign Application Priority Data

May 24, 2016  (JP) ................. 2016-103623

(51) Int. Cl.
*H02J 7/00* (2006.01)
*H02J 7/02* (2016.01)
(Continued)

(52) U.S. Cl.
CPC .............. *H02J 7/02* (2013.01); *G06Q 20/127* (2013.01); *G06Q 20/145* (2013.01);
(Continued)

(58) Field of Classification Search
CPC .......................................................... H02J 7/02
(Continued)

(56) References Cited

U.S. PATENT DOCUMENTS

| 8,816,649 B2 * | 8/2014 | Davis ..................... H02J 9/062 320/162 |
| 2002/0186576 A1 * | 12/2002 | Kanouda ................ H02J 9/061 363/125 |

(Continued)

FOREIGN PATENT DOCUMENTS

| JP | H05-089364 A | 4/1993 |
| JP | H10-031696 A | 2/1998 |

(Continued)

OTHER PUBLICATIONS

International Search Report issued in Patent Application No. PCT/JP2017/018945 dated Jun. 20, 2017.
Written Opinion issued in Patent Application No. PCT/JP2017/018945 dated Jun. 20, 2017.

*Primary Examiner* — Yalkew Fantu
(74) *Attorney, Agent, or Firm* — Pearne & Gordon LLP

(57) ABSTRACT

A charging system is configured to charge a charging target group including electronic devices which are stacked in a row and include their respective secondary batteries. A first receiver is configured to acquire, from the electronic devices, pieces of battery information representing remaining capacities of the secondary batteries, respectively. The second receiver is configured to obtain, from the electronic devices, pieces of position information representing positions of the electronic devices in the charging target group, respectively. The determining processor is configured to determine respective priorities of the electronic devices according to the pieces of battery information and the pieces of position information based on a judgment condition. The charge controller is configured to control charging of each of (Continued)

the electronic devices so that the electronic devices are charged according to the respective priorities.

11 Claims, 10 Drawing Sheets

(51) Int. Cl.

| | | |
|---|---|---|
| G06Q 20/12 | (2012.01) | |
| G06Q 20/14 | (2012.01) | |
| G07F 15/00 | (2006.01) | |
| H02J 50/10 | (2016.01) | |
| G07G 1/00 | (2006.01) | |
| H01M 10/44 | (2006.01) | |

(52) U.S. Cl.
CPC ......... *G07F 15/006* (2013.01); *G07G 1/0036* (2013.01); *H01M 10/44* (2013.01); *H02J 7/00* (2013.01); *H02J 7/0052* (2013.01); *H02J 50/10* (2016.02); *H02J 2007/0095* (2013.01)

(58) Field of Classification Search
USPC .......................................... 320/107
See application file for complete search history.

(56) References Cited

U.S. PATENT DOCUMENTS

| | | | |
|---|---|---|---|
| 2005/0093512 A1* | 5/2005 | Mader .................. | H01M 10/42 320/116 |
| 2008/0122400 A1* | 5/2008 | Kubota ................. | H02J 7/0004 320/106 |
| 2008/0174268 A1* | 7/2008 | Koo ...................... | A47L 9/2805 320/109 |
| 2012/0210143 A1* | 8/2012 | Amemura ............... | G06F 1/266 713/300 |
| 2014/0361734 A1 | 12/2014 | Yamazaki et al. | |
| 2015/0180270 A1 | 6/2015 | Takano | |
| 2016/0099588 A1* | 4/2016 | Bae ....................... | H02J 7/0024 320/107 |

FOREIGN PATENT DOCUMENTS

| | | |
|---|---|---|
| JP | 2001-334940 A | 12/2001 |
| JP | 2009-217364 A | 9/2009 |
| JP | 2015-119572 A | 6/2015 |
| WO | 2012-036024 A1 | 3/2012 |

\* cited by examiner

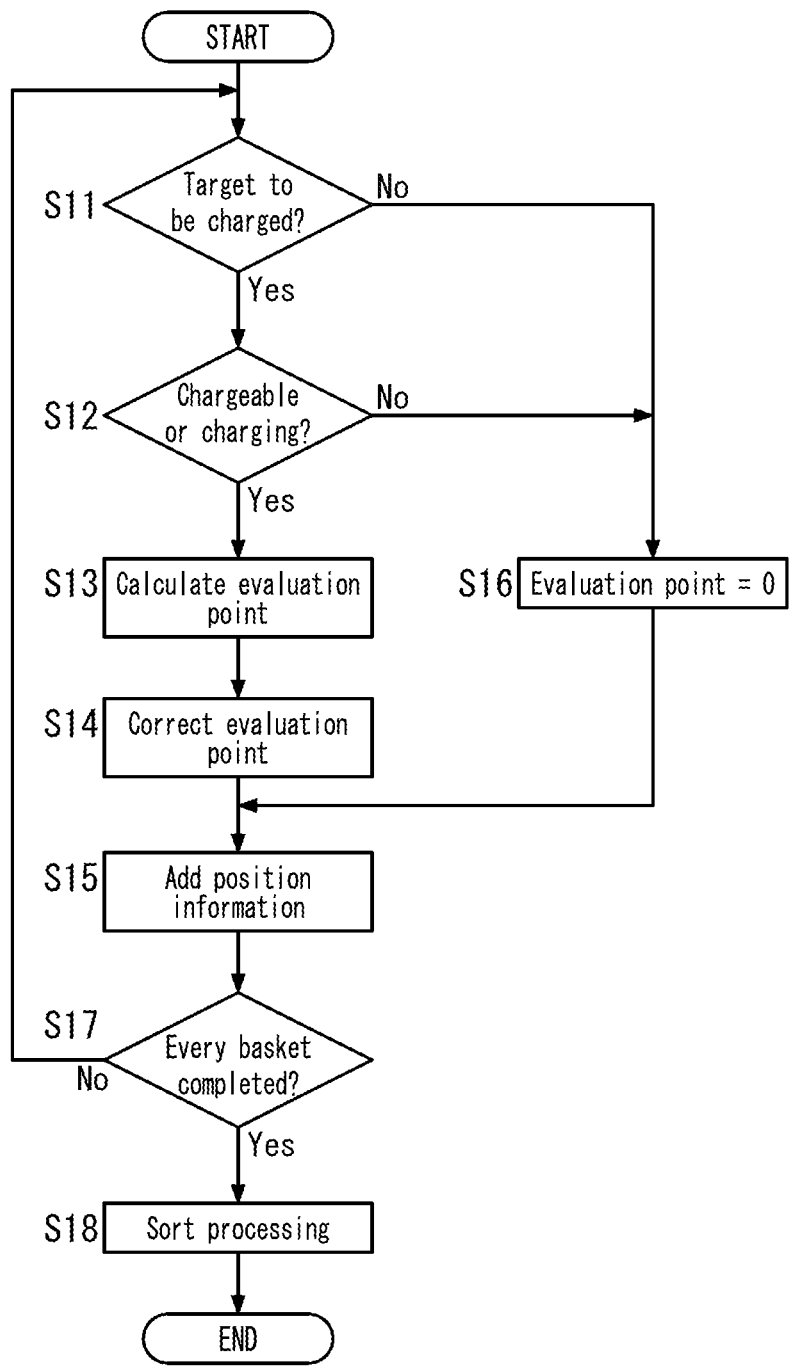

CHARGING SYSTEM

TECHNICAL FIELD

The invention relates generally to charging systems and, more particularly, to a charging system configured to charge electronic devices.

BACKGROUND ART

Patent Document 1 describes a system (POS system) directed to unmanned stores with no clerk.

The system described in Patent Document 1 is composed of a basket that allows one or more goods to be put in, and a transaction terminal device. The basket possesses a scanner configured to read one or more pieces of goods information (product data), and a transmitter circuit configured to transmit the one or more pieces of goods information to an outside. The transaction terminal device possesses a receiver circuit configured to receive the one or more pieces of goods information, a weighing scale configured to weigh the one or more pieces of goods put in the basket, and a control unit configured to compare a measured value weighed by the weighing scale with one or more pieces of weight data corresponding to the one or more pieces of goods information. The transaction terminal device will carry out a checkout process when the measured value by the weighing scale matches a total weight of the one or more pieces of weight data.

Here, the basket equipped with the scanner and the transmitter circuit as stated above is an electronic device with electronic circuits, and therefore requires securing a power supply for operations of the electronic circuits. This type of electronic device is to be carried in a store, and it is therefore conceivable that it is equipped with a secondary battery in order to secure the power supply for operations of the electronic circuits. However, in the case of this type of electronic device, two or more electronic devices are used in one store in general, and therefore charging the electronic devices at the same time requires a large capacity power supply facility.

CITATION LIST

Patent Literature

Patent Document 1; JP 1105-089364 A

SUMMARY OF INVENTION

With the foregoing in view, it is an object of the present invention to provide a charging system enabling charging of electronic devices with a relatively small capacity power supply facility.

A charging system in accordance with an aspect of the present invention is configured to charge a charging target group including electronic devices which are stacked in a row and include their respective secondary batteries. The charging system includes a first receiver, a second receiver, a determining processor and a charge controller. The first receiver is configured to acquire, from the electronic devices, pieces of battery information representing remaining capacities of the secondary batteries, respectively. The second receiver is configured to obtain, from the electronic devices, pieces of position information representing positions of the electronic devices in the charging target group, respectively. The determining processor is configured to determine respective priorities of the electronic devices according to the pieces of battery information and the pieces of position information based on a judgment condition. The charge controller is configured to control charging of each of the electronic devices so that the electronic devices are charged according to the respective priorities.

BRIEF DESCRIPTION OF DRAWINGS

FIG. 6 is a flowchart showing a priority determining process for the charging system;

DESCRIPTION OF EMBODIMENTS

(1) Schema

Figure 1:
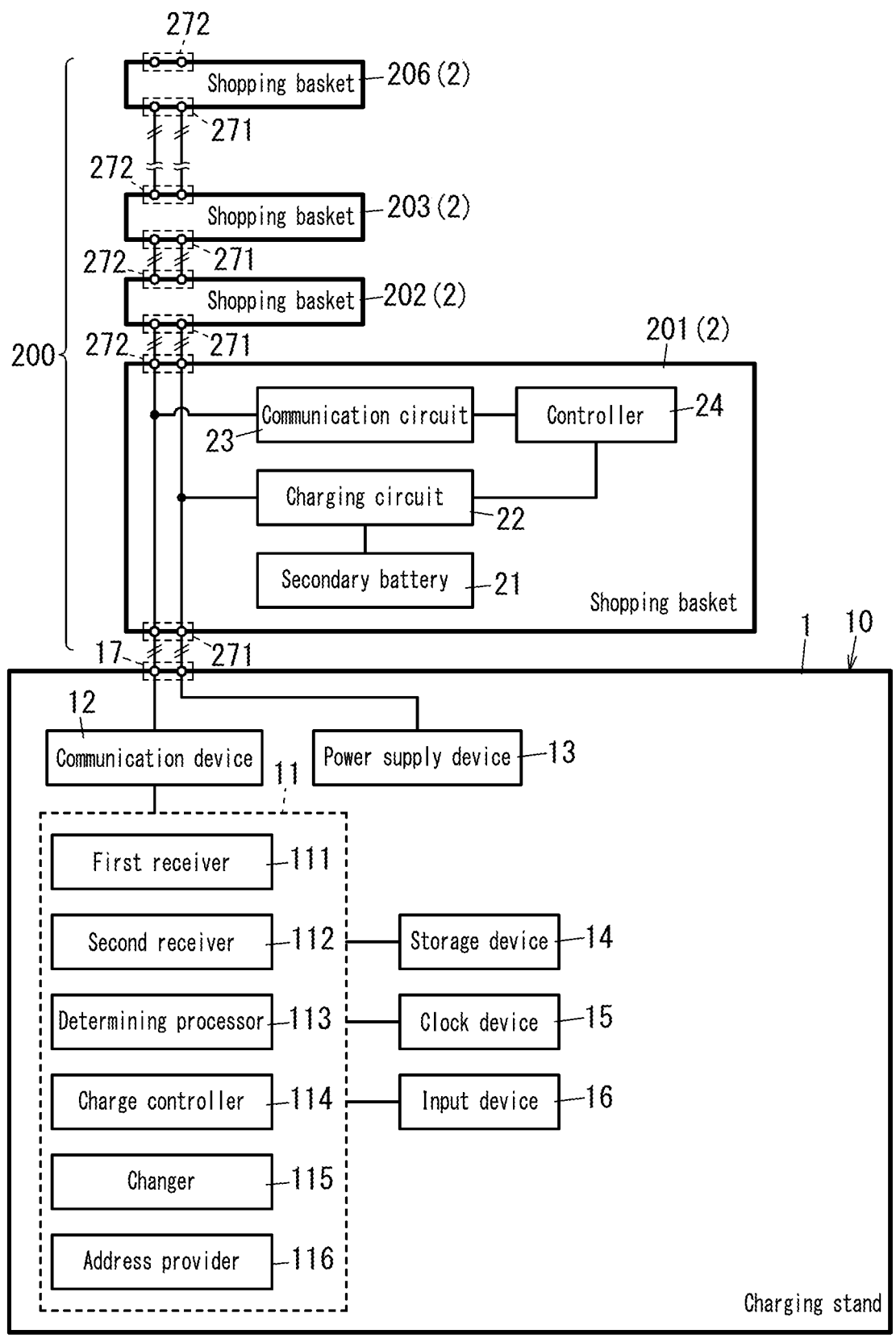
FIG. 1 is a block diagram of a charging system in accordance with an embodiment of the present invention.

The schema of a charging system 10 in accordance with the present embodiment will be first explained with reference to FIGS. 1 and 2. In the present embodiment, shopping baskets 201 to 206 are exemplified as electronic devices to be charged in the charging system 10. Hereinafter, when two or more (in this example, six) shopping baskets 201 to 206 are not specifically distinguished, each of the shopping baskets 201 to 206 is referred to as a "shopping basket 2".

The charging system 10 is a system configured to charge the shopping baskets 2 to be used in retail stores. Examples thereof include convenience stores, supermarkets, department stores, drugstores, electronics retail stores, home centers (hardware stores) and the like. Each of the shopping baskets 2 is an electronic device equipped with: electronic circuits for a scanner, a transmitter and receiver circuit, and the like; and a secondary battery 21 as a power supply for respective operations of the electronic circuits.

The shopping baskets 2 as the electronic devices supposed herein constitute, along with a store device(s), a shopping assistance system that is introduced to a store and configured to assist customers' shopping. The store device stated herein is a device that is installed in, for example a register counter in the store and possesses functions of a checkout process and the like. Each of the shopping baskets 2 includes, at least, a basket body 20 (see FIG. 3) that allows one or more goods to be put in, the scanner configured to read one or more pieces of goods information from the one or more goods, respectively, and the transmitter and receiver circuit configured to communicate with the store device. Each of the shopping baskets 2 is put on the register counter, and then transmits one or more pieces of goods information to the store device through its own transmitter and receiver circuit. This enables the store device to perform a checkout process for one or more goods based on one or more pieces of goods information from the shopping basket 2.

Stores which the shopping baskets 2 are introduced into enable customers to finish purchasing goods by a series of acts of, in the stores, picking up goods, putting them in a shopping basket 2, and performing a checkout process through a store device. That is, since the shopping basket 2 is able to read goods information, whenever one item of goods (a product) is put in the shopping basket 2, the shopping basket 2 is able to acquire corresponding goods information of the one item of goods. One or more pieces of goods information on one or more goods put in the shopping basket 2 are transmitted from the shopping basket 2 to store device, thereby enabling a checkout process thereof and the like. Stores which the shopping baskets 2 are introduced into therefore enable reduction in customers' shopping time as a result of, for example reduction in time from the start of a checkout process to the completion of receipt of goods with respect to customers while reducing store employees' (store clerks') and customers' labor.

The shopping baskets 2 as stated above are placed in, for example a basket area near the entrance of a store when customers visit, like general shopping baskets with no electronic circuits (scanner, transmitter and receiver circuit, and the like). When a shopping basket 2 is used, namely when a customer is shopping, the customer moving in the store carries the shopping basket 2 taken out from the basket area, or uses a shopping cart with the shopping basket 2 put therein. When the customer's shopping is over and all the goods are discharged from a basket body 20 thereof, the shopping basket 2 is returned to the basket area.

Herein, each of the shopping baskets 2 includes the secondary battery 21 as a power supply for operations of electronic circuits for the scanner, the transmitter and receiver circuit, and the like. Thus, electric power for operations of the shopping basket 2 (electronic circuits) during the use thereof is supplied from the secondary battery 21. It is accordingly necessary to charge the shopping basket 2 (secondary battery 21) after the use of the shopping basket 2. Therefore, the charging system 10 in accordance with the present embodiment charges the shopping basket 2 placed in the basket area.

Shopping baskets 2 are introduced into one store in general, and therefore the charging system 10 requires charging the shopping baskets 2. Although individual charging of the shopping baskets 2 is conceivable, such a configuration causes a problem that the number of required power supply facilities increases and the area occupied by the basket area also increases.

Therefore, the charging system 10 in accordance with the present embodiment is configured to charge the shopping baskets 2 in a state where the shopping baskets 2 are stacked up in a row. That is, in the charging system 10 in accordance with the present embodiment, one power supply facility (charging stand 1) charges the shopping baskets 2 as a target in a state where the shopping baskets 2 are stacked up in a longitudinal direction (vertical direction) in the basket area. Here, the shopping baskets 2 are electrically connected in series or parallel to the power supply facility. This enables the one power supply facility to charge the shopping baskets 2 with the area occupied by the basket area kept small.

In addition, charging the shopping baskets 2 at the same time requires a large capacity power supply facility, and increases the cost for the power supply facility. Therefore, a power supply system enabling a relatively small capacity power supply facility to charge shopping baskets 2 is desired.

On the other hand, a handling method of shopping baskets 2 stacked up in a row is generally a method of taking out a basket, placed last in the basket area, first, namely a method of Last In First Out (LIFO). Specifically, the shopping baskets 2 are stacked in order from the bottom. Therefore, a shopping basket 2 after use is returned on the top of the charging target group 200, while a shopping basket 2 to be used is taken out from the top of the charging target group 200. As a result, for example, several shopping baskets 2 from the top in the charging target group 200 are used intensively during slack time of few customers. Secondary batteries 21 of the several shopping baskets 2 from the top used intensively are to have their respective remaining capacities less than respective remaining capacities of several shopping baskets 2 from the bottom.

There is therefore a possibility that a charging method of causing a small capacity power supply facility to evenly distribute electric power to shopping baskets 2 to charge the shopping baskets 2 uniformly may cause shortage of remaining capacities of secondary batteries 21 in shopping baskets 2 used intensively (the several shopping baskets 2 from the top).

Therefore, in order to charge shopping baskets 2 stacked up in a row, the charging system 10 in accordance with the present embodiment determines respective priorities of the shopping baskets 2 based on remaining capacities of secondary batteries 21 thereof and positions of the shopping baskets 2 in the charging target group 200, and then charges the shopping baskets 2 according to the respective priorities. The charging system 10 basically controls charging of each of the shopping baskets 2 so that charging of each of the shopping baskets 2 is completed in order from the shopping basket 2 having the highest priority. Thus, the charging system 10 in accordance with the present embodiment does not charge the shopping baskets 2 uniformly, but associates the shopping baskets 2 with their respective priorities based the remaining capacities of the secondary batteries 21 thereof and the positions of the shopping baskets 2 in the charging target group 200 to charge them.

This enables the charging system 10 to render priorities of the shopping baskets 2 used intensively (the several shopping baskets 2 from the top) higher while causing the small capacity power supply facility to distribute electric power to the shopping baskets 2, thereby avoiding shortage of remaining capacities of secondary batteries 21 in specific shopping baskets 2.

The charging system 10 in accordance with the present embodiment consequently enables a relatively small capacity power supply facility to charge the shopping baskets 2.

(2) Details

Hereinafter, a configuration of the charging system 10 in accordance with the present embodiment will be described in detail. In the present embodiment, the charging system 10 to charge shopping baskets 2 used in a convenience store is exemplified.

(2.1) Overall Configuration

Here, the overall configuration of the charging system 10 in accordance with the present embodiment will first be explained in reference with FIGS. 1 and 2. The charging system 10 includes one charging stand 1 and two or more (here, six) shopping baskets 2 as a target to be charged.

Each of the shopping baskets 2 includes the secondary battery 21 and a charging circuit 22 configured to charge the secondary battery 21. In other words, each of the shopping baskets 2 includes at least one secondary battery 21. The charging stand 1 is installed in the basket area. The shopping baskets 2 are stacked up in a row on the charging stand 1 and constitute the charging target group 200. That is, the charging stand 1 will charge the charging target group 200, as a target, which includes the shopping baskets 2 stacked up in a longitudinal direction (vertical direction) in the basket area.

The shopping baskets 2 are stacked in order from the bottom. Accordingly, the n-th (n is a natural number) shopping basket 2 from the bottom is hereinafter referred to as the "n-th" shopping basket 2 unless otherwise noted. For example, a shopping basket 201 placed directly on the charging stand 1 is referred to as the "first" shopping basket 2, and a shopping basket 202 right above the shopping basket 201 is referred to as the "second" shopping basket 2.

Here, the shopping baskets 2 are connected to the charging stand 1 in a daisy chain. That is, each of the shopping baskets 2 is provided with a connector 27 including an input terminal unit 271 and an output terminal unit 272. The input terminal unit 271 of the first shopping basket 201 is connected to a connector 17 of the charging stand 1, while the output terminal unit 272 of the first shopping basket 201 are connected to the input terminal unit 271 of the second shopping basket 202. The output terminal unit 272 of the second shopping basket 202 are connected to the input terminal unit 271 of the third shopping basket 203. Thus, the shopping baskets 2 constituting the charging target group 200 are connected in series to the charging stand 1. This enables the charging stand 1 to supply electric power to the shopping baskets 2 constituting the charging target group 200. Each of shopping baskets 2 is supplied with electric power from the charging stand 1 and then causes its own charging circuit 22 to charge its own secondary battery 21.

In the present embodiment, since the shopping baskets 2 are provided with their respective charging circuits 22 configured to charge a corresponding secondary battery 21, the shopping baskets 2 will be described as being included in the components of the charging system 10. However, the shopping baskets 2 as the target to be charged needn't be included in the components of the charging system 10 because it is the charging stand 1 that supplies electric power to the shopping baskets 2 to substantially charge the shopping baskets 2. In short, the components of the charging system 10 may include a charging circuit(s) 22, or may include no charging circuit 22 like the present embodiment.

(2.2) Shopping Basket

Figure 3:
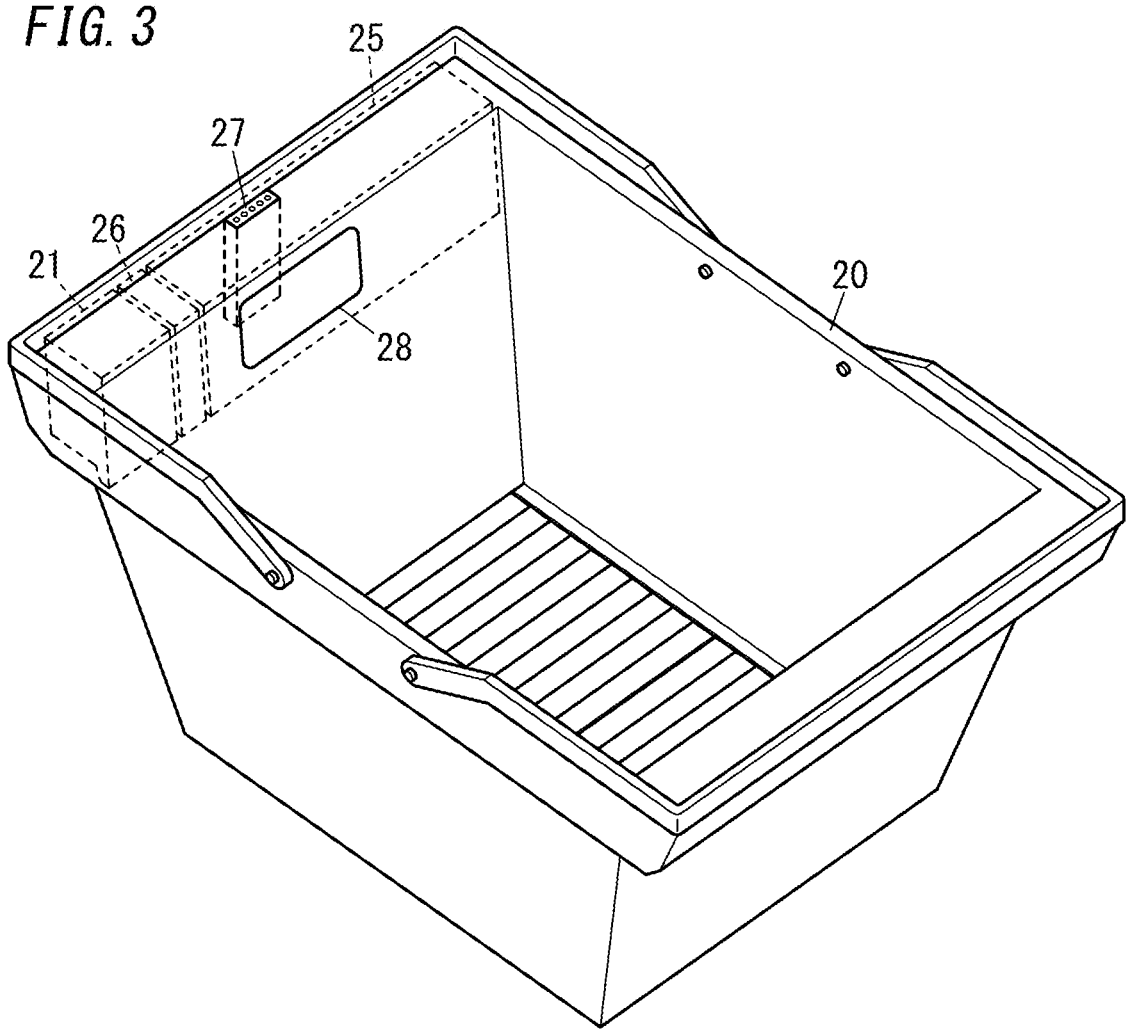
FIG. 3 is an external perspective view of a shopping basket in the charging system.

A shopping basket 2 as each element of the target to be charged in the charging system 10 will be next explained. As shown in FIG. 3, the shopping basket 2 possesses the basket body 20, the secondary battery 21 (battery), a circuit block 25, a charging block 26 and the connector 27.

The basket body 20 is in the shape of a box with at least an opening formed in an upper surface thereof, and allows two or more goods (products) to be put in. The circuit block 25 includes various electronic circuits configured to receive electric power from the secondary battery 21 to be activated, and a module. The charging block 26 includes the charging circuit 22 (see FIG. 1) configured to charge the secondary battery 21, and the like. The connector 27 is a connector that allows the charging block 26 to be electrically connected to the charging stand 1. The secondary battery 21 is, for example a lithium ion battery. The secondary battery 21 supplies electric power to the circuit block 25, thereby activating the circuit block 25.

The circuit block 25 includes a display 28, the scanner configured to read one or more pieces of goods information from one or more goods, and the transmitter and receiver circuit configured to communicated with the store device. The "goods information" stated herein is information for identifying each item of goods (each product), and examples thereof include Japanese Article Number (JAN) code used in Japan, and the like. Examples of the scanner include a barcode reader, a reader configured to read a two-dimensional code, a tag reader configured to read goods information from a Radio Frequency Identification (RFID) tag in a non-contact manner, an image sensor, and the like. The goods information read through the scanner is to be stored in a memory included in the circuit block 25. The transmitter and receiver circuit is configured to transmit pieces of goods information stored in the memory all together to store device, or divide the pieces of goods information into packets to transmit the packets to the store device. The transmitter and receiver circuit will communicate with the store device by optical wireless communication whose medium is, for example, infrared or visible radiation, or by radio communication whose medium is radio waves. The display 28 is configured to perform display based on, for example, display data of advertisement etc. received by the transmitter and receiver circuit from the store device, goods information read through the scanner, and the like.

Figure 2:
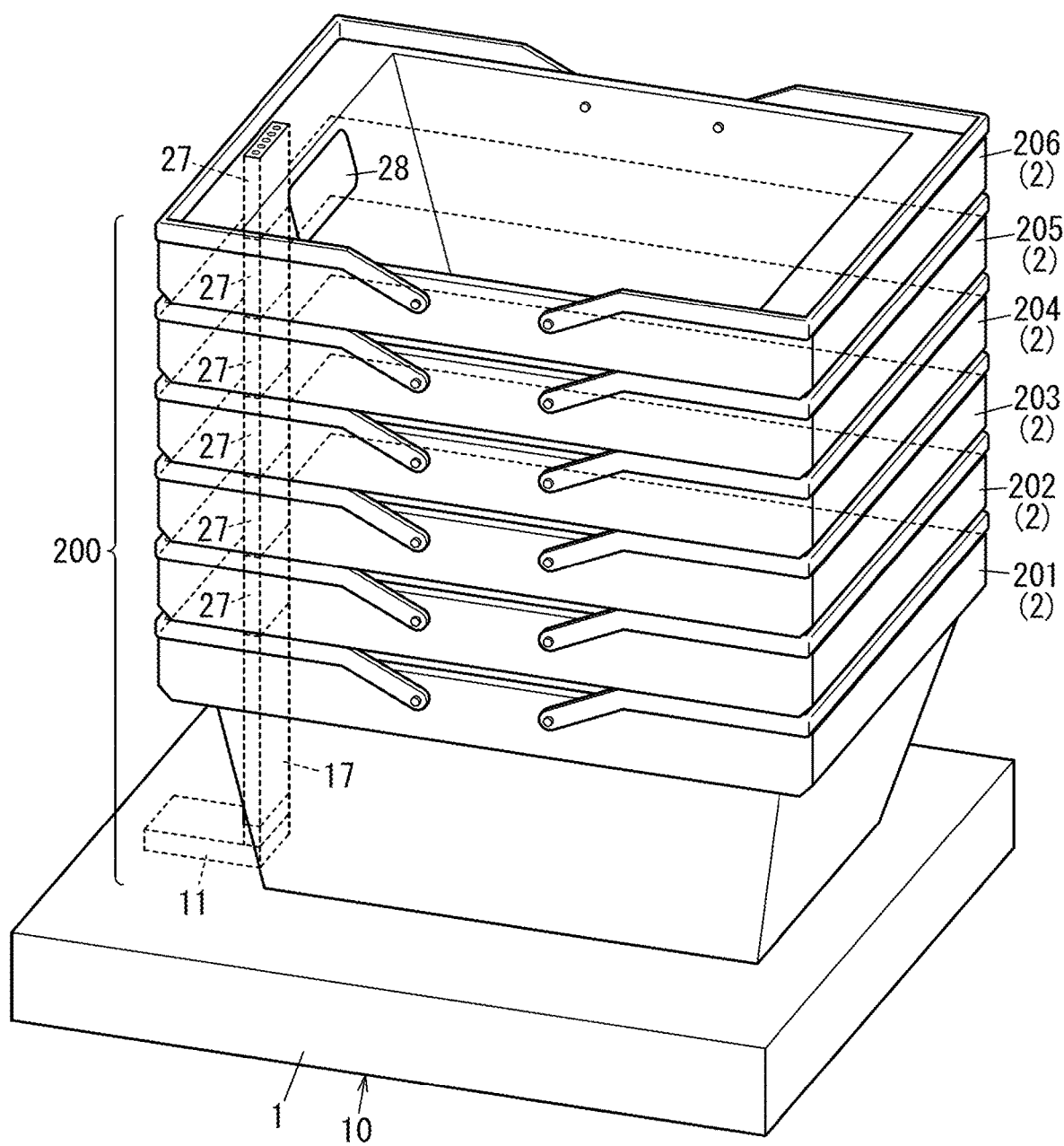
FIG. 2 is an external perspective view of the charging system.

As shown in FIG. 1, the charging block 26 includes the charging circuit 22, a communication circuit 23 and a controller 24. The charging block 26 is electrically connected with the connector 27 that allows the charging block 26 to be electrically connected to the charging stand 1. The charging circuit 22 is configured to receive electric power from the charging stand 1 to charge the secondary battery 21. The communication circuit 23 is configured to communicate with the charging stand 1. The controller 24 is configured to control the charging circuit 22 and the communication circuit 23. The controller 24 includes, for example a micro controller unit (MCU) as a main component. The connector 27 possesses terminals for receiving electric power from the charging stand 1, terminals for communication with the charging stand 1, and a terminal for detection of an enabling signal. Although the details will be explained in "(3.1) Positioning algorithm", a communication function of the communication circuit 23 is enabled only in a state where the enabling signal of high level (H level) is received via the terminal for detection of the enabling signal. In other words, the communication function of the communication circuit 23 is disabled in a state where the enabling signal is low level (L level).

Here, the shopping baskets 2 are assigned (associated with) pieces of identification information that are unique, respectively. The pieces of identification information are stored in, for example a memory of the controller 24. Each piece of identification information is information unique to a corresponding shopping basket 2, and therefore a piece of identification information is fixedly determined for one shopping basket 2 irrespective of the position of the shopping basket 2 in the charging target group 200. For example, when a shopping basket 2 possesses identification information of "1", the identification information is "1" and unchanged even when the shopping basket 2 is any of the first shopping basket 2, the second shopping basket 2, and the like. In the present embodiment, for example, information unique to each device (shopping basket 2) such as media access control (MAC) address doubles as identification information.

The secondary battery 21, the circuit block 25, the charging block 26 and the connector 27 are built in part of the basket body 20. Note that part of the circuit block 25 such as the display 28, the scanner, an operation button and the like, and part of the connector 27 are exposed from a surface of the basket body 20.

(2.3) Charging Stand

A configuration of the charging stand 1 will be next explained with reference to FIG. 1.

The charging stand 1 possesses a control circuit 11, a communication device 12, a power supply device 13, a storage device 14, a clock device 15, an input device 16 and the connector 17.

The communication device 12 is configured to communicate with the shopping baskets 2 constituting the charging target group 200. In the present embodiment, the communication device 12 performs two-way communication with each communication circuit 23 of the shopping baskets 2 by, for example serial communication. Since the shopping baskets 2 are connected in series to the charging stand 1, the communication device 12 will communicate with shopping baskets 2 according to respective addresses assigned to the shopping baskets 2.

The power supply device 13 is configured to supply the shopping baskets 2 constituting the charging target group 200 with electric power for charging respective secondary batteries 21. In the present embodiment, the power supply device 13 includes an AC/DC converter configured to convert AC power into DC power, and will supply the DC power to the shopping baskets 2.

The storage device 14 is configured to store various pieces of data. The clock device 15 is configured to specify the current date and time including the current date, current day of the week, and current time. The input device 16 is connected to an operation terminal to be operated by, for example a clerk and configured to receive an input signal from the operation terminal.

The control circuit 11 includes a first receiver 111, a second receiver 112, a determining processor 113, a charge controller 114, a changer 115 and an address provider 116. In the present embodiment, the control circuit 11 includes a micro controller (micro controller unit (MCU)) as a main component thereof. In the control circuit 11, a program stored in a memory of the micro controller is executed by a processor thereof, thereby realizing respective functions of the first receiver 111, the second receiver 112, the determining processor 113, the charge controller 114, the changer 115 and the address provider 116.

The first receiver 111 is configured to acquire battery information from each of the shopping baskets 2. The "battery information" stated herein is information on a remaining capacity of the secondary battery 21 possessed by a corresponding shopping basket 2. The first receiver 111 may cause the communication device 12 to communicate with the shopping baskets 2, thereby acquiring battery information from each of the shopping baskets 2. The first receiver 111 may acquire, for each of the shopping baskets 2, battery information at regular intervals to store the acquired battery information in the storage device 14. Herein, the first receiver 111 associates the battery information with identification information unique to a corresponding shopping basket 2 in a one-to-one correspondence and then stores, in the storage device 14, battery information for each piece of identification information, thereby associating the shopping baskets 2 with their respective pieces of battery information. In the present embodiment, battery information on a remaining capacity of each secondary battery 21 is a relative state of charge (RSOC) obtained by dividing a remaining capacity (RC) of the secondary battery 21 by a full charge capacity (FCC) of the secondary battery 21. The relative state of charge (RSOC) stated herein is synonymous with a state of charge (SOC).

The second receiver 112 is configured to acquire position information from each of the shopping baskets 2. The "position information" stated herein is information on a position of a corresponding shopping basket 2 in the charging target group 200. That is, the position information is another piece of information different from corresponding identification information, and varies according to the position of the corresponding shopping basket 2 in the charging target group 200 and is not fixedly determined for one shopping basket 2. For example, a shopping basket 2 that possesses identification information of "1" is to possess position information representing the "first" when it is the "first" shopping basket 2, and possess information representing the "second" when it is the "second" shopping basket 2. The second receiver 112 may cause the communication device 12 to communicate with the shopping baskets 2, thereby acquiring position information from each of the shopping baskets 2. The second receiver 112 may acquire, for each of the shopping baskets 2, position information at regular intervals to store the acquired position information in the storage device 14. Herein, the second receiver 112 associates the position information with identification information unique to a corresponding shopping basket 2 in a one-to-one correspondence and stores, in the storage device 14, position information for each piece of identification information, thereby associating the shopping baskets 2 with their respective pieces of position information. In the present embodiment, each address of the shopping baskets 2 used for communication with the charging stand 1 doubles as position information of a corresponding shopping basket 2.

The determining processor 113 is configured to determine a priority of each of the shopping baskets 2 from the pieces of battery information and the pieces of position information based on a judgment condition. The "judgment condition" stated herein is a judgment condition that is used to determine priorities from the pieces of battery information and the pieces of position information and that is represented by, for example a mathematical formula into which battery information and position information are incorporated as parameters. The "priority" is a level of specifying which shopping basket 2 to preferentially charge when the shopping baskets 2 are charged. Basically, a priority of a shopping basket 2 to complete charging earlier is set higher. A specific procedure (algorithm) for determining priorities through the determining processor 113 will be described in "(3.3) Priority determining algorithm". The determining processor 113 may determine, for each of the shopping baskets 2, a priority at regular intervals from the pieces of battery information and the pieces of position information stored in the storage device 14 and store the determined priority in the storage device 14 with the determined priority associated with a corresponding shopping basket 2. Herein, the determining processor 113 associates the priority with identification information unique to a corresponding shopping basket 2 in a one-to-one correspondence and stores, in the storage device 14, a priority for each piece of identification information, thereby associating the shopping baskets 2 with their respective priorities.

The charge controller 114 is configured to control charging of each of the shopping baskets 2 so that the shopping baskets 2 are charged according to the respective priorities determined through the determining processor 113. The charge controller 114 may basically control charging of each of the shopping baskets 2 so that charging is completed in order from the shopping basket 2 with the highest priority of the shopping baskets 2. Here, the charge controller 114 controls charging of each of the shopping baskets 2 by controlling, for example, charging timing of each shopping basket 2 and electric power (electric current) to be delivered to each shopping basket 2. This therefore enables the charge controller 114 to individually set respective values of charging currents for the shopping baskets 2 according to the priorities even when the shopping baskets 2 are charged at the same time. As a result, even when the shopping baskets 2 are charged at the same time, an amount of charging power (current values) supplied from the charging stand 1 for each of the shopping baskets 2 may be different from each other. It is therefore possible to perform fast charging of shopping baskets 2 with a relatively higher priority by more increasing charging current values for the shopping baskets 2 than charging current values for other shopping baskets 2. A specific process of charging control by the charge controller 114 will be explained in "(3.2) Charging control process".

In the present embodiment, since each of the shopping baskets 2 is provided with the charging circuit 22 configured to charge a corresponding secondary battery 21, the charge controller 114 will provide each of the shopping baskets 2 with a charge/discharge command for controlling charging of a corresponding shopping basket 2, thereby indirectly controlling operations of the charging circuits 22. The charge controller 114 is to transmit the charge/discharge command to each of the shopping baskets 2 from the communication device 12. Each of the shopping baskets 2 receives its own charge/discharge command, and then causes its own controller 24 to control a corresponding charging circuit 22 according to the charge/discharge command. Thus, the charge controller 114 not directly but indirectly controls charging of each of the shopping baskets 2.

The changer 115 is configured to change the determining condition for the determining processor 113. That is, the determining condition for the determining processor 113 is not fixed, but appropriately changed according to, for example a frequency of use of each shopping basket 2. A specific procedure (algorithm) for changing the judgment condition by the changer 115 will be explained in "(3.5) Judgment condition changing algorithm". In the present embodiment, the changer 115 will change the judgment condition by, according to each frequency of use of the shopping baskets 2 or the like, alternatively selecting a judgment condition to be used by the determining processor 113 from judgment conditions of two or more patterns stored in the storage device 14 in advance. Note that the changer 115 is not limited to this configuration, but may appropriately change the judgment condition according to each frequency of use of the shopping baskets 2 or the like.

The address provider 116 is configured to assign an address as position information to each of the shopping baskets 2 constituting the charging target group 200. That is, the address provider 116 will assign an address to each of the shopping baskets 2 stacked up on the charging stand 1. Each address assigned through the address provider 116 is used for communication between the charging stand 1 and a corresponding shopping basket 2. A specific procedure (algorithm) for assigning addresses through the address provider 116 will be explained in "(3.1) Positioning algorithm". When there is a change in the shopping baskets 2 constituting the charging target group 200 due to addition, reduction or replacement of a shopping basket(s) 2, the address provider 116 may assign an address to each of the shopping baskets 2 after the change. The address provider 116 may assign an address to each of the shopping baskets 2 at regular intervals and store, in the storage device 14, an address assigned for each of the shopping baskets 2. Herein, the address provider 116 associates the address with identification information unique to a corresponding shopping basket 2 in a one-to-one correspondence and then stores, in the storage device 14, an address for each piece of identification information, thereby associating the shopping baskets 2 with their respective addresses.

(3) Operation

An operation of the charging system 10 in accordance with the present embodiment will be next explained.

(3.1) Positioning Algorithm

Figure 4:
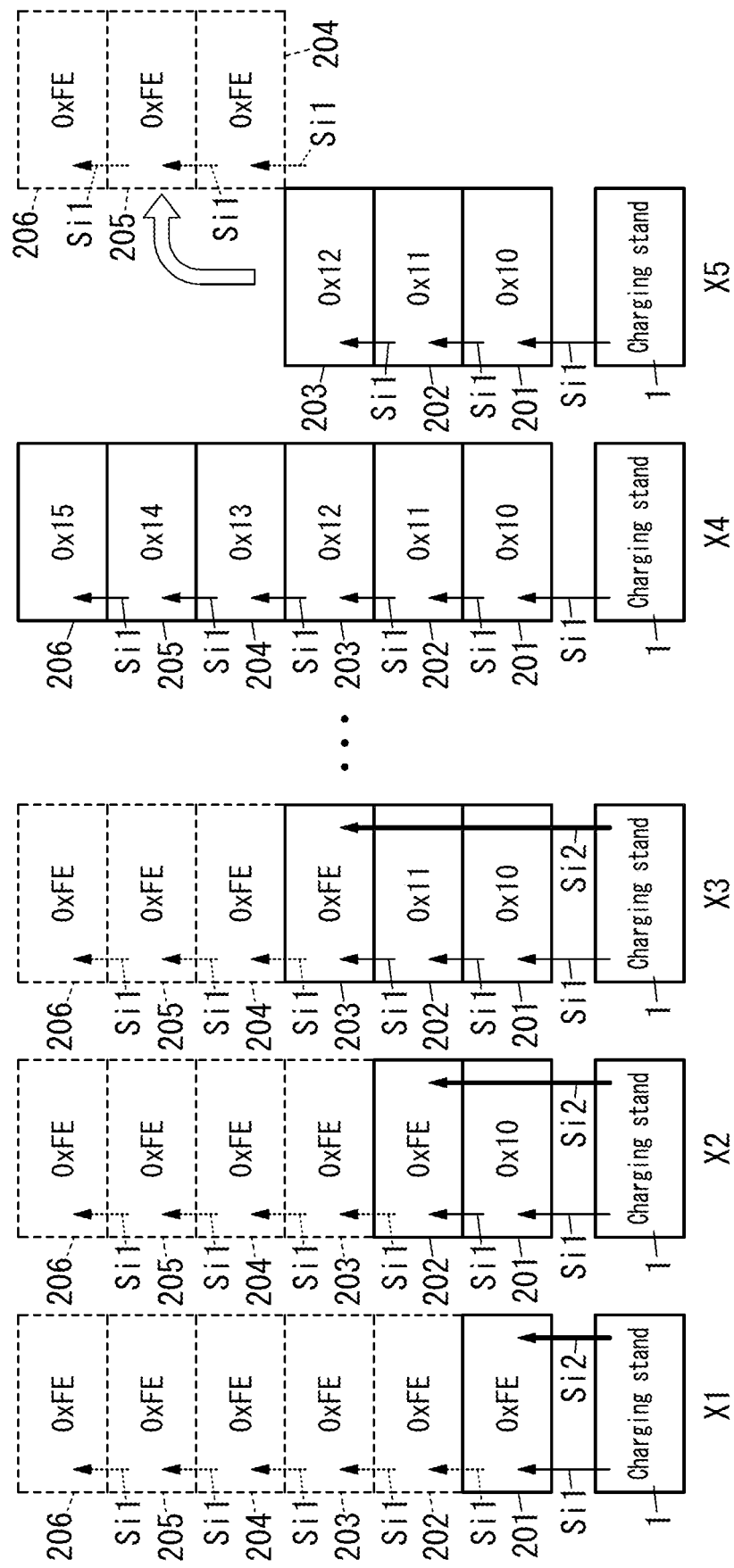
FIG. 4 is an explanatory diagram of a positioning algorithm schematically showing a charging stand and a shopping basket in the charging system.

Positioning algorithm for specifying a position of each of the shopping baskets 2 in the charging target group 200 will be explained with reference to FIG. 4. In FIG. 4, the charging stand 1 and the shopping baskets 201 to 206 are schematically illustrated, and the addresses of the shopping baskets 201 to 206 are depicted in respective blocks of the shopping baskets 201 to 206. Herein, each of shopping baskets 2 with a communication function of its own communication circuit 23 being in an enabled state is indicated by a solid line, while each of shopping baskets 2 with a communication function of its own communication circuit 23 being in a disabled state is indicated by a broken line. Moreover, each enabling signal Si1 of High Level (H level) is indicated by a solid line, while each enabling signal Si1 of Low Level (L level) is indicated by a broken line.

In the present embodiment, the addresses of the shopping baskets 2 for communication with the charging stand 1 double as respective pieces of position information. Therefore, respective positions of the shopping baskets 2 in the charging target group 200 are to be specified as a result of the address provider 116 assigning an address to each of the shopping baskets 2. Herein, it is assumed that two or more (here, six) shopping baskets 2 are put (stacked up) together on the charging stand 1. In addition, as one example here, it is assumed that the shopping baskets 2 are assigned serial addresses such that the first shopping basket 201 is assigned the address of "0x10", the second shopping basket 202 is assigned the address of "0x11", the third shopping basket 203 is assigned the address of "0x12", etc.

First, in a state of X1 where no address is assigned to any of the shopping baskets 2, the address of "0xFE" as a provisional address is assigned to each of the shopping baskets 2. The "provisional address" stated herein is predetermined and is an address for communication with the charging stand 1 in a state where no address is assigned from the charging stand 1. In the state of X1, only the first shopping basket 201 of the shopping baskets 2 receives an enabling signal Si1 of High Level (H level) from the charging stand 1, thereby making the communication function of its own communication circuit 23 enabled. The first shopping basket 201 whose communication function is made enabled receives a setting signal Si2 transmitted at regular intervals (e.g., period of 100 ms) from the charging stand 1.

The shopping baskets 2 receive the setting signal Si2 with their own addresses being the provisional address of "0xFE", and then start communication for address setting with the charging stand 1. In the state of X1, since any of the shopping baskets 2 is assigned no address, the charging stand 1 assigns the shopping basket 201 the address of "0x10" for the first shopping basket 201. Thus, the first shopping basket 201 is assigned the address of "0x10" (state of X2).

In the state of X2 where the first shopping basket 201 is assigned the address, the first shopping basket 201 changes the level of a terminal, for detection of the enabling signal Si1, of the output terminal unit 272 from low level (L level) to high level (H level). That is, the shopping basket 2 that has been assigned its own address provides an enabling signal Si1 of H level to the shopping basket 2 located right above. As a result, the second shopping basket 202 receives the enabling signal Si1 of H level from the first shopping basket 201, thereby making the communication function of its own communication circuit 23 enabled. The second shopping basket 202 whose communication function is made enabled receives a setting signal Si2 transmitted at regular intervals from the charging stand 1. At this moment, the second shopping basket 202 receives the setting signal Si2 with its own address being the provisional address of "0xFE", and therefore starts communication for address setting with the charging stand 1. In the state of X2, since only the first shopping basket 201 is assigned the address, the charging stand 1 assigns the shopping basket 202 the address of "0x11" for the second shopping basket 202. Thus, the second shopping basket 202 is assigned the address of "0x11" (state of X3).

The charging stand 1 repeats the same process until there is no response from every shopping basket 2 assigned the provisional address of "0xFE", thereby assigning an address to each of the first to sixth shopping baskets 201 to 206. That is, the third shopping basket 203, the fourth shopping basket 204, the fifth shopping basket 205 and the sixth shopping basket 206 are assigned "0x12", "0x13", "0x14" and "0x15", respectively (state of X4). Thus, even when two or more (here, six) shopping baskets 2 are placed together on the charging stand 1, the charging stand 1 recognizes the shopping baskets 2 one by one to assign the shopping baskets 2 respective addresses one by one.

In the state of X4 where each of the shopping baskets 201 to 206 constituting the charging target group 200 is assigned its own address, when one or more shopping baskets 2 are taken out from the charging target group 200, each of the one or more shopping baskets 2 is assigned the provisional address of "0xFE" again. In a state of X5 assumed as an example, three (firth to sixth) shopping basket 204 to 206 are taken out form the top. In this example, the level of the terminal for detection of the enabling signal Si1 of the input terminal unit 271 in each of the shopping basket 204 to 206 is changed from high level (H level) to low level (L level). When detecting the change of the enabling signal Si1 to L level, each of the shopping baskets 2 initializes its own address so as to be assigned the provisional address of "0xFE" and disables the communication function of its own communication circuit 23. When there is no reply from the shopping baskets 2 assigned addresses of "0x13", "0x14" and "0x15", the charging stand 1 recognizes that the fourth to sixth shopping baskets 2204 to 206 are in use. Thus, when two or more (here, three) shopping baskets 2 are taken out together, the charging stand 1 recognizes at once that the shopping baskets 2 are in use.

(3.2) Charging Control Process

Figure 5:
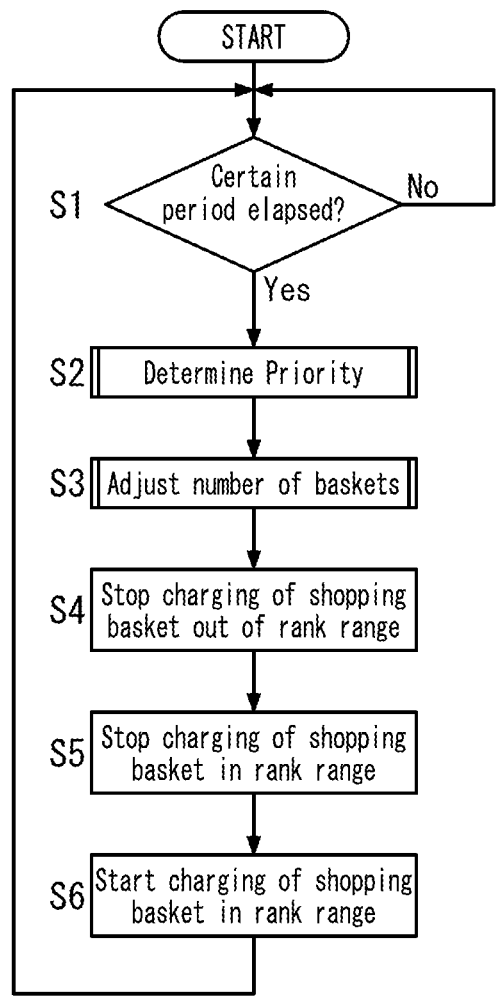
FIG. 5 is a flowchart showing a charging control process for the charging system.

The charge controller 114 will execute a charging control process of shopping baskets 2 according to a flowchart shown in FIG. 5.

In the present embodiment, the charge controller 114 charges the allowable number of shopping baskets 2 from the highest priority of the shopping baskets 2 constituting the charging target group 200 at the same time. The "allowable number" stated herein is the number of shopping baskets 2 to be charged at the same time in allowable electric power that is determined by a rated output of the power supply device 13 and the like. As one example, when power consumption of one shopping basket 2 during charging is 8 [W], the allowable number is given by an integer part of a value obtained by dividing the allowable electric power by 8 [W]. Hereinafter, each of shopping baskets 2 each of which has a priority in a range of the allowable number from the highest priority is called a "shopping basket 2 in rank range", while each of shopping baskets 2 each of which exceeds the allowable number therefrom is called a "shopping basket 2 out of rank range". The allowable electric power is appropriately adjustable according to an input signal from the input device 16. The allowable electric power may include power consumption of the charging stand 1 itself.

Basically, the charge controller 114 charges each shopping basket 2 in rank range of the shopping baskets 2 constituting the charging target group 200, and stops charging each shopping basket 2 out of rank range. Note that the charge controller 114 stops charging each shopping basket 2 even if it is in rank range as long as it is abnormal or in full charge (charging rate of 100%).

Specifically, the charge controller 114 is configured to output a charge/discharge command whenever a certain time (for example, 100 ms) elapses, and stands by until the certain period of time has elapsed (S1: No). When the certain period of time has elapsed (S1: Yes), the charging stand 1 causes the determining processor 113 to execute a priority determining process of determining priorities (S2). The priority determining process will be explained in detail in "(3.3) Priority determining algorithm". Upon completion of the priority determining process, the charge controller 114 executes a number adjusting process of adjusting the allowable number (S3). The number adjusting process will be explained in detail in "(3.4) Number adjusting algorithm".

The charge controller 114 provides each shopping basket 2 out of rank range with a charge/discharge command (discharge command) for stopping charging thereof, thereby causing its own charging circuit 22 to stop charging (S4). The charge controller 114 also provides the charge/discharge command (discharge command) for stopping charging to each shopping basket 2 out of rank range that is abnormal or in full charge, thereby causing its own charging circuit 22 to stop charging (S5). The charge controller 114 provides each shopping basket 2 in rank range with a charge/discharge command (charge command) for staring charging (or continuing charging), thereby causing its own charging circuit 22 to start (or continue) charging (S6).

The charging stand 1 repeats the process of S1 to S6 stated above, thereby charging each shopping basket 2 in rank range. Therefore, when there is a change in the shopping baskets 2 constituting the charging target group 200 due to addition, reduction or replacement of a shopping basket(s) 2, each shopping basket 2 in rank range of shopping baskets 2 after the change is charged.

(3.3) Priority Determining Algorithm

A priority determining process executed through Process S2 of FIG. 5, namely a specific procedure (algorithm) for determining priorities through the determining processor 113 will be next explained with reference to a flowchart of FIG. 6.

In the present embodiment, the determining processor 113 calculates, for each of the shopping baskets 2, an evaluation point from the pieces of battery information and the pieces of position information, thereby allocating a higher priority to a shopping basket 2 with a higher evaluation point. Here, the determining processor 113 calculates an evaluation point for each piece of identification information unique to every shopping basket 2. Each evaluation point is calculated by substituting a corresponding "battery point" and a corresponding "position point" for a mathematical formula as a judgment condition, where the "battery point" is a score (point) represented according to corresponding battery information, while the "position point" is a score (point) represented according to a corresponding position. The battery point is a value that is defined to be a high score as the relative remaining capacity as corresponding battery information is smaller. On the other hand, the position point is a value that is defined to be a high score as the position is more apart from the charging stand 1, namely a corresponding shopping basket 2 is located on the upper side of the charging target group 200.

As an example in the present embodiment, it is assumed that each evaluation point is represented by 32 bits. Here, the most significant 16 bits thereof contain a score of the evaluation point calculated from corresponding battery and position points. The next 8 bits contain a correction value obtained by correction of the evaluation point, the least significant 8 bits contain corresponding position information (address). That is, each evaluation point has data structure of "score (16 bits)+correction value (8 bits)+position information (8 bits)".

Specifically, the determining processor 113 first determines whether or not each of shopping baskets 2 is contained in the charging target group 200 (S11). At this moment, the determining processor 113 determines whether or not position information is acquired from each shopping basket 2, thereby determining whether or not a corresponding shopping basket 2 is contained in the charging target group 200. That is, the determining processor 113 determines that shopping baskets 2 each of which has identification information associated with position information (address) are contained in the charging target group 200. The determining processor 113 determines that shopping baskets 2 each of which has identification information not associated with position information are not contained in the charging target group 200.

When a shopping basket 2 is contained in the charging target group 200 (S11: Yes), the determining processor 113 determines whether or not the shopping basket 2 is chargeable or charging (S12). At this moment, when a state of the shopping basket 2 is fully charged (full charge) and when it is abnormal, etc., it is determined that the shopping basket 2 is neither chargeable nor charging (S12: No). When the shopping basket 2 is chargeable or charging (S12: Yes), the determining processor 113 calculates an evaluation point from corresponding battery and position points (S13). The most significant 16 bits of the 32-bit evaluation point as stated above is to contain, as a score, the evaluation point calculated through the process of S13.

The determining processor 113 then performs correction of the evaluation point (S14). The correction of the evaluation point is a process of avoiding shopping baskets 2 having the same evaluation point, and corrects the evaluation point, for example as follows. That is, when the battery information (relative remaining capacity) represents 50% or more, the most significant 1 bit of the correction value represented by 8 bits is rendered "0" and the least significant 7 bits are rendered the battery point. On the other hand, when the battery information represents less than 50%, the most significant 1 bit of the correction value represented by 8 bits is rendered "1" and the least significant 7 bits are rendered the battery point.

The determining processor 113 then adds the position information to the corrected evaluation point (S15). That is, the determining processor 113 causes the least significant 8 bits of the 32-bit evaluation point as stated above to contain the position information. Thus, the evaluation point calculated through the determining processor 113 contains the position information (address), and is thereby directly associated with the position information. When the charge controller 114 provides the shopping basket 2 with the charge/discharge command, it is therefore easy to identify the address to be provided with the charge/discharge command, and the processing load is reduced.

On the other hand, when the shopping basket 2 is not contained in the charging target group 200 (S11: No), and when the shopping basket 2 is neither chargeable nor charging (S12: No), the determining processor 113 renders the evaluation point (score and correction value) "0". That is, the most significant 24 bits of the 32-bit evaluation point are rendered "0". The determining processor 113 then performs the process of S15. Note that when the shopping basket 2 is not contained in the charging target group 200 (S11: No), there is no position information corresponding to the shopping basket 2, and therefore the determining processor 113 adds, in place of position information, information of content of "position information unknown" through the step of S15.

The determining processor 113 performs a process of S11 to S16 as stated above for each of the shopping baskets 2, and repeats the process of S11 to S16 until the process for every shopping basket 2 is completed (S17: No). When the process of S11 to S16 for every shopping basket 2 is completed (S17: Yes), the determining processor 113 executes a sort process based on the evaluation points (each of which contains a score, a correction value and position information). At this moment, the determining processor 113 performs rearrangement (sort process) of the evaluation points in order from the shopping basket 2 having the largest (highest) evaluation point with respect to the evaluation points of the shopping baskets 2. The ranks (aligned order) thereof after the sort process form priorities. That is, the determining processor 113 determines the priorities according to the evaluation points so that serial priorities such as "1". "2", "3", . . . are assigned in order from the hopping basket 2 having the largest evaluation point.

As described above, various methods are conceivable as a method of calculating an evaluation point (score) from corresponding battery information (battery point) and corresponding position information (position point). Some specific calculation methods will be exemplified below.

(i) Multiplication Method 1

As a first example, there is a method (referred to as "Multiplication method 1") of calculating, as each evaluation point, a multiplication result of corresponding battery point and position point. In this example, the battery point is given 1 point for 1[%] according to 0[%] to 100[%]—a relative remaining capacity (RSOC) as corresponding battery information. That is, battery points of 100, 99, 98, 1 and 0 are assigned according to the relative remaining capacities of 0, 1, 2, 99 and 199[%], respectively. In addition, the position point is given 1 to 100 according to a corresponding position—the first to top (e.g., 100th) shopping baskets. That is, when the top shopping basket is the 100th one, the 100th shopping basket is assigned 100. Similarly, the 99th, 98th, 2nd and 1st shopping baskets are assigned 99, 98, 2 and 1, respectively.

Figure 7A:
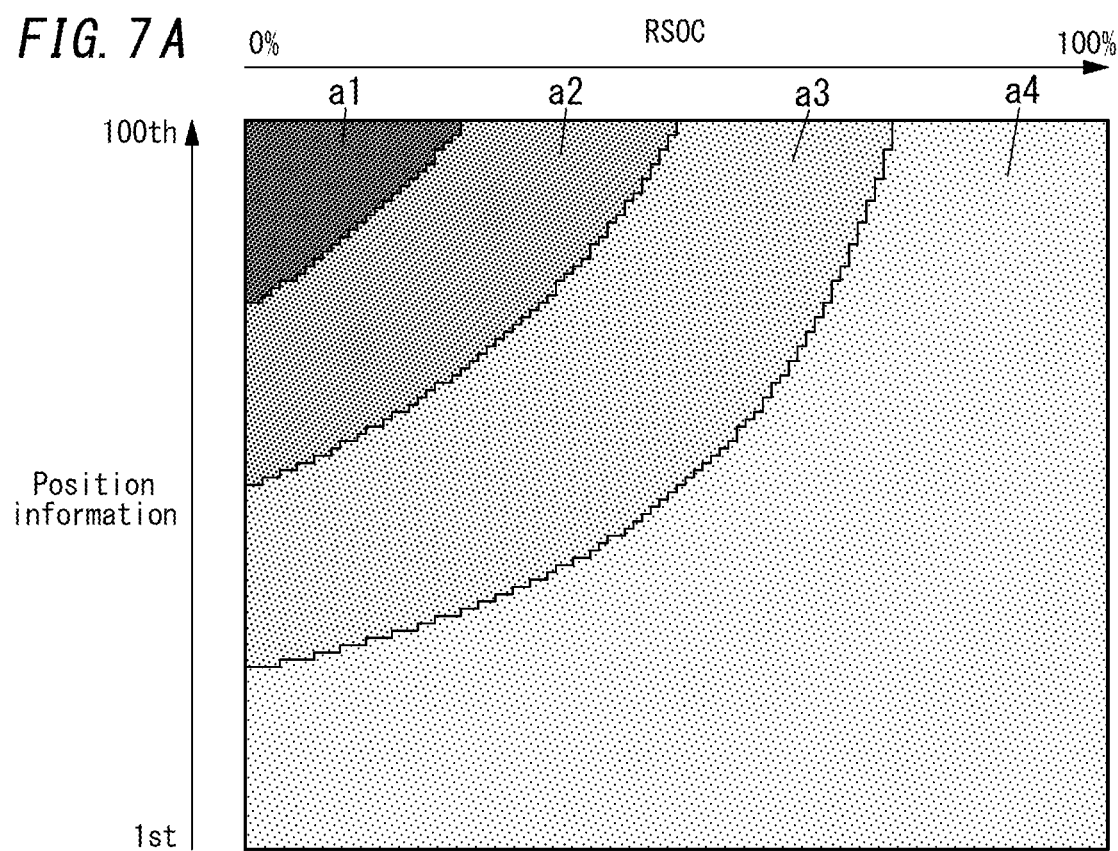
FIG. 7A is a graph showing the distribution of evaluation points by Multiplication method 1 in the charging system.

By performing the multiplication for each battery and position points as defined in this manner, evaluation points in a range of 0 to 10000 points are calculated as shown in FIG. 7A. FIG. 7A represents the distribution of evaluation points (scores), where the horizontal axis represents battery information (relative remaining capacity) and the vertical axis represents position information (1st to 100th shopping baskets). In FIG. 7A, an area of "a1" represents evaluation points in a range of 100 to 75[%] of the highest point, an area of "a2" represents evaluation points in a range of 75 to 50[%] of the highest point, an area of "a3" represents evaluation points in a range of 50 to 25[%] of the highest point, and an area of "a4" represents evaluation points in a range of 25 to 0[%] of the highest point. Notation of such evaluation points is the same in FIGS. 7B to 8B to be described below. That is, in "Multiplication method 1", each evaluation point varies according to corresponding battery and position points in a quadratic manner. Moreover, in "Multiplication method 1", each evaluation point is equally weighted with weighting factors given to corresponding battery and position points, and therefore the corresponding battery and position points equally contribute to the evaluation point in question.

(ii) Multiplication Method 2

As a second example, there is a method (referred to as "Multiplication method 2") of calculating, as each evaluation point, a multiplication result of corresponding battery point and position point. In this example, the battery point is given 1 point for 10[%] according to 0[%] to 100[%]—a relative remaining capacity (RSOC) as corresponding battery information. That is, battery points of 10, 9, 8, 1 and 0 are assigned according to the relative remaining capacities of 0, 10, 20, 90 and 100[%], respectively. In addition, the position point is given 1 to 100 according to a corresponding position—the first to top (e.g., 100th) shopping baskets, like "Multiplication method 1".

Figure 7B:
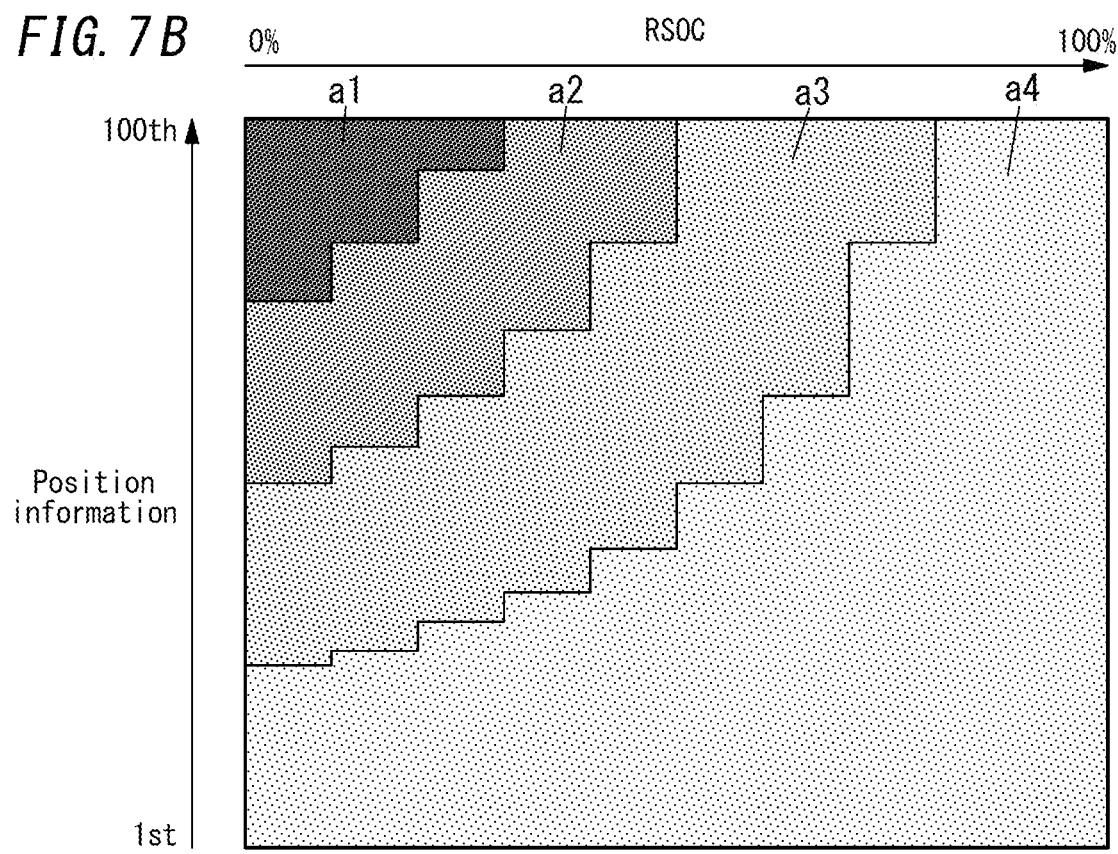
FIG. 7B is a graph showing the distribution of evaluation points by Multiplication method 2 in the charge system.

By performing the multiplication for each battery and position points as defined in this manner, evaluation points in a range of 0 to 1000 points are calculated as shown in FIG. 7B. That is, in "Multiplication method 2", evaluation points greatly vary in units of 10% of battery points.

(iii) Addition Method 1

As a third example, there is a method (referred to as "Addition method 1") of calculating, as each evaluation point, an addition result of corresponding battery point and position point. In this example, the battery point is given 1 point for 1[%] according to 0[%] to 100[%]—a relative remaining capacity (RSOC) as corresponding battery information, like "Multiplication method 1". In addition, the position point is given 1 to 100 according to a corresponding position—the first to top (e.g., 100th) shopping baskets, like "Multiplication method 1".

Figure 8A:
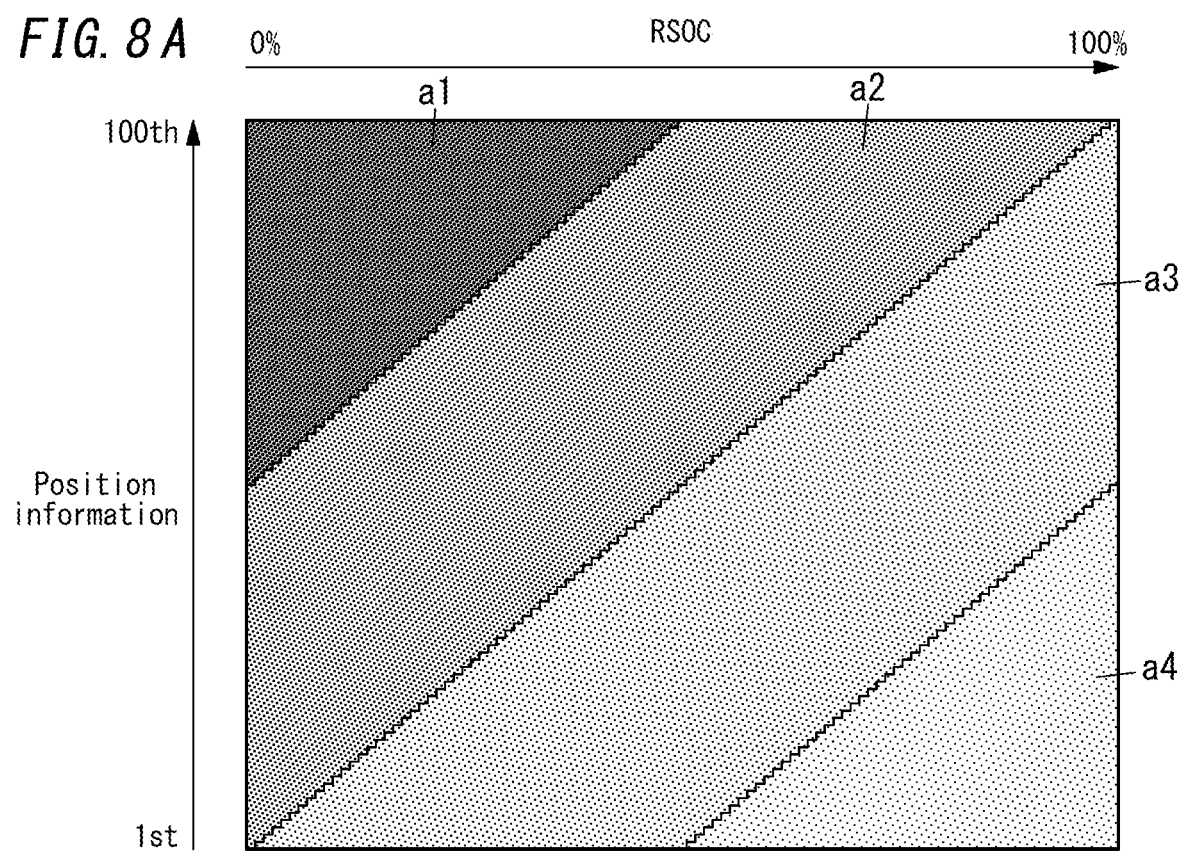
FIG. 8A is a graph showing the distribution of evaluation points by Addition method 1 in the charging system.

By performing the addition for each battery and position points as defined in this manner, evaluation points in a range of 1 to 200 points are calculated as shown in FIG. 8A. That is, in "Addition method 1", each evaluation point varies according to corresponding battery and position points in a linear manner. Moreover, in "Addition method 1", each evaluation point is equally weighted with weighting factors given to corresponding battery and position points, and therefore the corresponding battery and position points equally contribute to the evaluation point in question.

(iv) Addition Method 2

As a fourth example, there is a method (referred to as "Addition method 2") of calculating, as each evaluation point, an addition result of corresponding battery point and position point. In this example, the battery point is given 1 point for 10[%] according to 0[%] to 100[%]—a relative remaining capacity (RSOC) as corresponding battery information, like "Multiplication method 2". In addition, the position point is given 1 to 100 according to a corresponding position—the first to top (e.g., 100th) shopping baskets, like "Multiplication method 1".

Figure 8B:
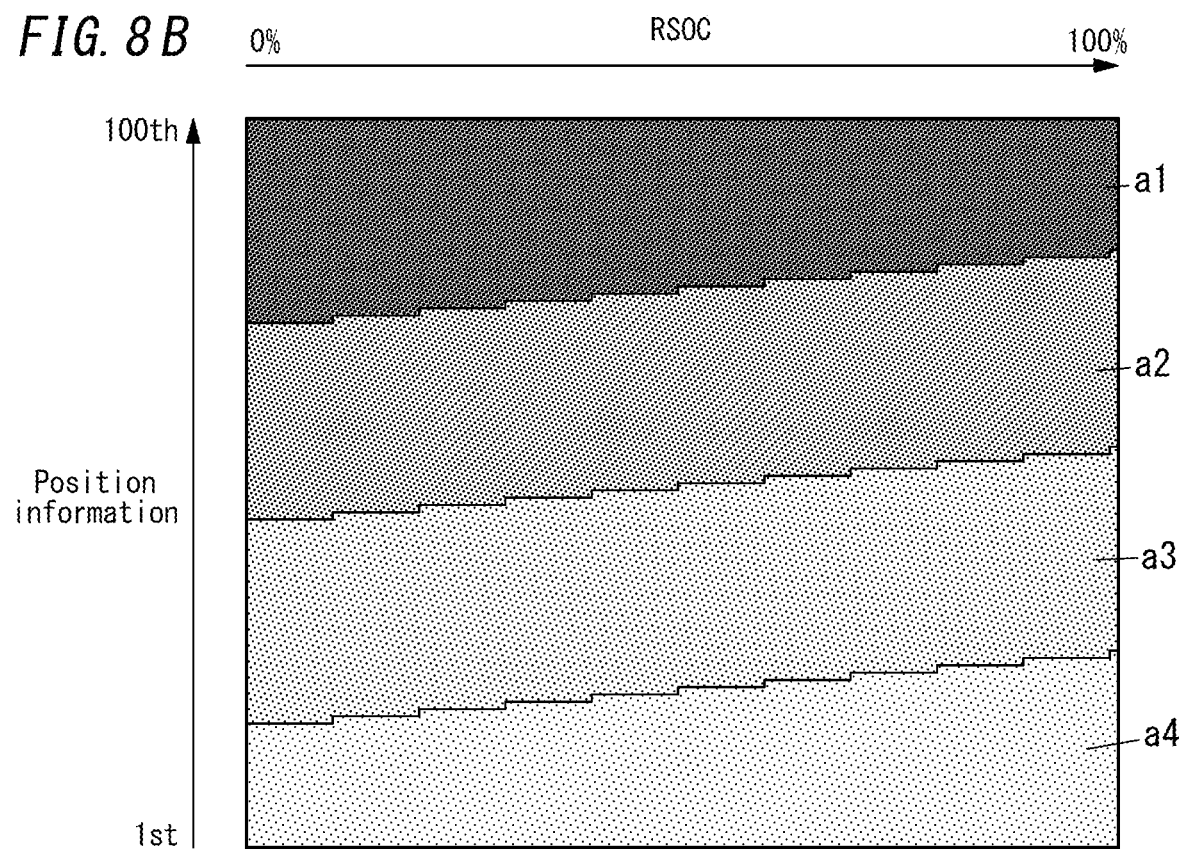
FIG. 8B is a graph showing the distribution of the evaluation points by Addition method 2 in the charging system.

By performing the addition for each battery and position points as defined in this manner, evaluation points in a range of 1 to 110 points are calculated as shown in FIG. 8B. That is, in "Addition method 2", each evaluation points varies according to corresponding battery and position points in a linear manner. Moreover, in "Addition method 2", each evaluation point is weighted with weighting factor given to the position point being greater than weighting factor given to the battery point, and therefore the position point is more dominant in contribution to the evaluation point than the battery point.

In the mathematical formulas as the judgment condition as stated above, at least two types of multiplication and addition are exemplified as combination of corresponding battery information and position information (battery and position points). That is, ways of the combination of corresponding battery information and position information includes multiplication of a battery point and a position point represented as scores by the corresponding battery information and position information, respectively, and addition of a battery point and a position point represented as scores by the corresponding battery information and position information, respectively. In addition, each of the mathematical formulas as the judgment condition includes weighting of each piece of the corresponding battery information and position information (battery and position points). That is, the judgment condition includes at least one of; combination of the corresponding battery information and position information; and weighting of each piece of the corresponding battery information and position information.

(3.4) Number Adjusting Algorithm

Figure 9:
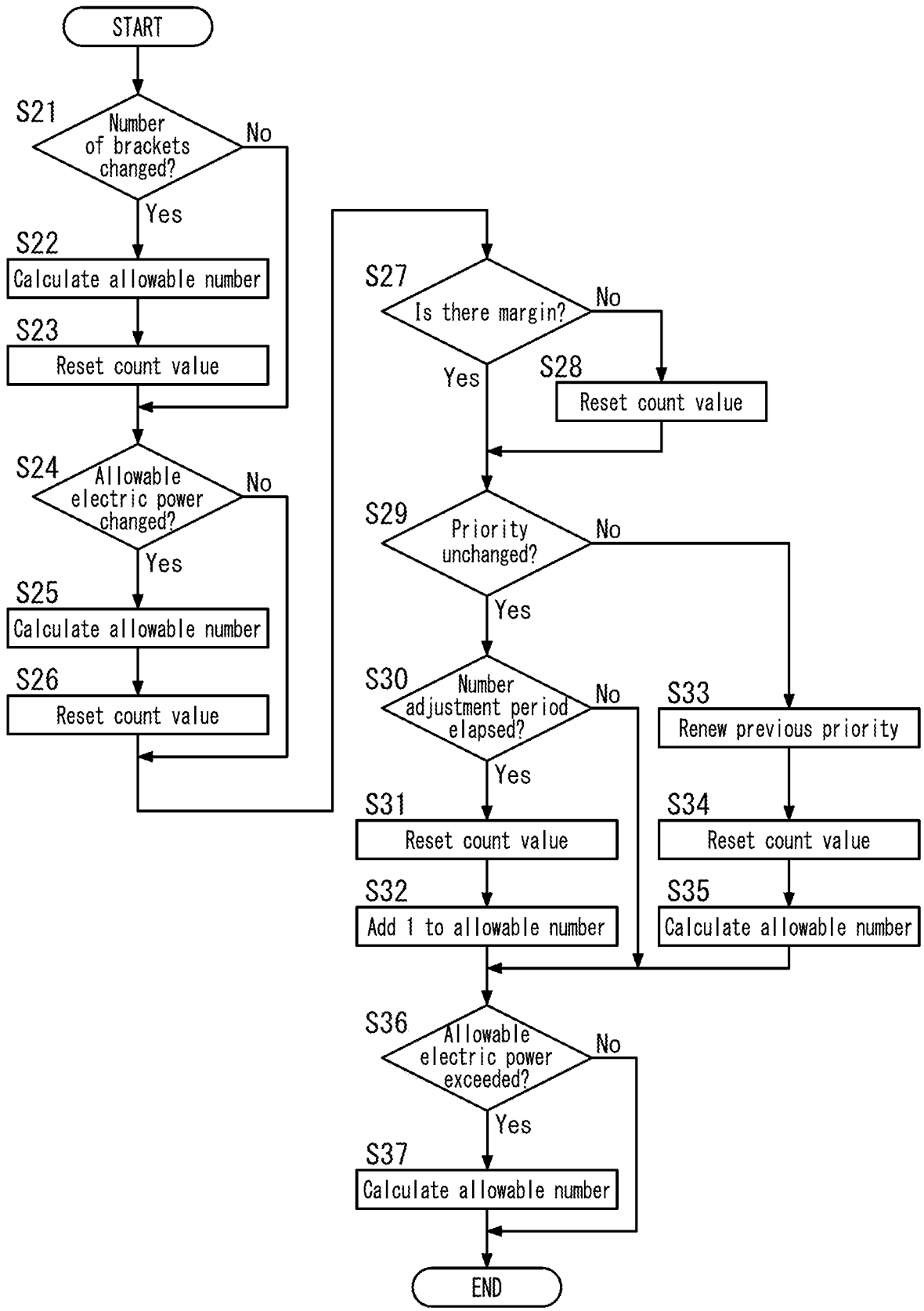
FIG. 9 is a flowchart showing a number adjusting process for the charging systems.

Number adjusting algorithm executed through a process of S3 in FIG. 5 will be next explained with reference to a flowchart of FIG. 9.

The number adjusting algorithm is basically a process of increasing the allowable number of shopping baskets 2 that are chargeable at the same time in allowable electric power, thereby enabling more efficient charge. For example, when "surplus electric power" is equal to or greater than power consumption in one shopping basket 2 during charging, the allowable number is increased by one. Here, the surplus electric power is a difference value between the allowable electric power and actual output power of the power supply device 13 during charging. Therefore, when the surplus electric power increases in this manner, the charge controller 114 increases the allowable number, thereby performing a number adjusting process of allowing more shopping baskets 2 to be chargeable at the same time. It is accordingly possible to shorten the time required for completing charging of each of the shopping baskets 2 constituting the charging target group 200.

Specifically, the charge controller 114 determines whether or not the number of shopping baskets 2 constituting the charging target group 200 is changed (S21). When the number of shopping baskets 2 constituting the charging target group 200 is changed (S21: Yes), the charge controller 114 calculates the allowable number at that time from the allowable electric power (S22), and resets (initializes) a count value as a number adjustment period (S23). When the number of shopping baskets 2 constituting the charging target group 200 is unchanged (S 21: No), the charge controller 114 skips Steps S22 and S23.

The charge controller 114 then determines whether or not magnitude of the allowable electric power is changed (S24). When the magnitude of the allowable electric power is changed (S24: Yes), the charge controller 114 calculates the allowable number at that time from the allowable electric power (S25), and resets the count value as the number adjustment period (S26). When the magnitude of the allowable electric power is unchanged (S24: No), the charge controller 114 skips Steps S25 and S26.

The charge controller 114 then determines whether there is a margin to increase the allowable number by one based on the surplus electric power (S27). At this moment, when the surplus electric power is equal to or greater than power consumption in one shopping basket 2 during charging, the charge controller 114 determines that there is a margin to increase the allowable number by one. When the surplus electric power is less than the power consumption in one shopping basket 2 during charging, the charge controller 114 determines that there is no margin to increase the allowable number by one. When there is no margin to increase the allowable number by one (S27: No), the charge controller 114 resets the count value as the number adjustment period (S28). When there is a margin to increase the allowable number by one (S27: Yes), the charge controller 114 skips Step S28.

The charge controller 114 then determines whether or not the current priorities of the shopping baskets 2 are the same as the previous priorities thereof (S29). When the current priorities are the same as the previous priorities, namely when the priorities are unchanged, the charge controller 114 determines whether or not the number adjustment period has elapsed (S30). When the number adjustment period has elapsed (S30: Yes), namely when the count value as the number adjustment period has reached a predetermined value, the charge controller 114 resets the count value as the number adjustment period (S31), and increases the allowable number by one (S32). As a result, the allowable number of shopping baskets 2 that are chargeable at the same time is increased by one. When the number adjustment period has not elapsed (S30: No), the charge controller 114 skips Steps S31 and S32.

When the current priorities are not the same as the previous priorities (S29: No), namely when the priorities are changed, the charge controller 114 does not proceed to Step S30 but executes Steps S33 to S35. That is, when the current priorities are not the same as the previous priorities (S29: No), the charge controller 114 rewrites the previous priorities with the current priorities (S33), resets the count value as the number adjustment period (S34), and calculates the allowable number at that time from the allowable electric power (S35).

The charge controller 114 then determines whether or not the actual output power of the power supply device 13 during charging exceeds the allowable electric power (S36). When the output power exceeds the allowable electric power (S36: Yes), the charge controller 114 calculates the allowable number at that time from the allowable electric power (S37). Accordingly, when the allowable electric power is exceeded as a result of the allowable number being increased by one, the allowable number is decreased by one. When the output power does not exceed the allowable electric power (S36: No), the charge controller 114 skips Step S37.

By executing the process as stated above, the allowable number of shopping baskets 2 that are chargeable at the same time is increased when the number adjustment period has elapsed in a state where the state of the shopping baskets 2 constituting the charging target group 200 is unchanged and there is a margin to increase the allowable number by one.

Figure 10A:
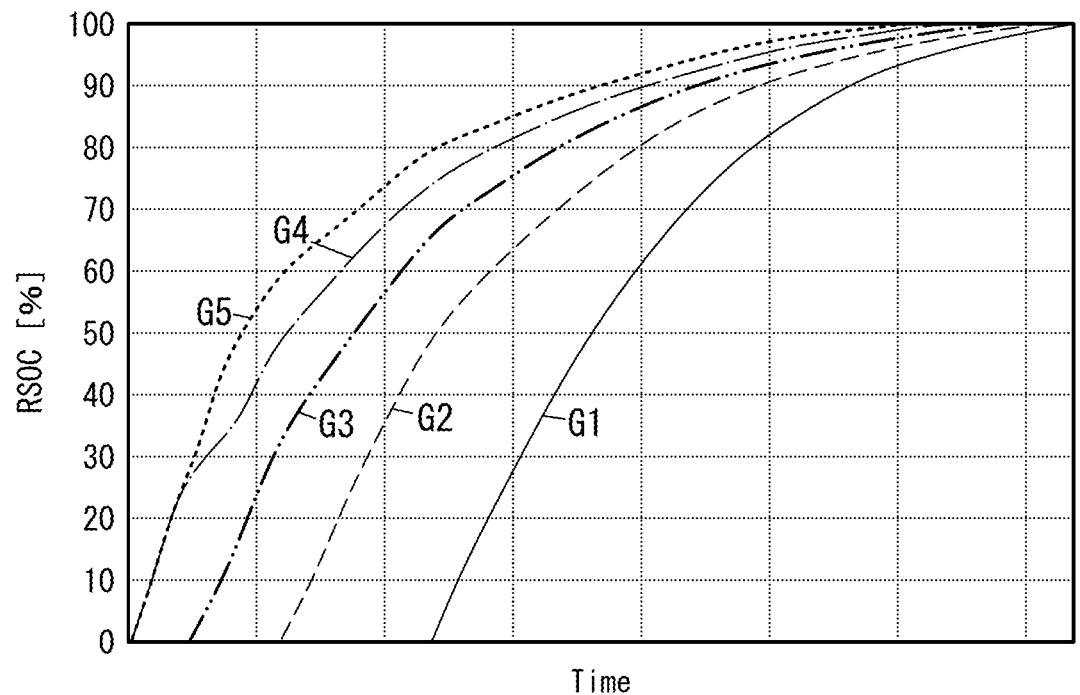
FIG. 10A is a graph showing a simulation result in the case where the number adjusting process is not applied to the charging system.
Figure 10B:
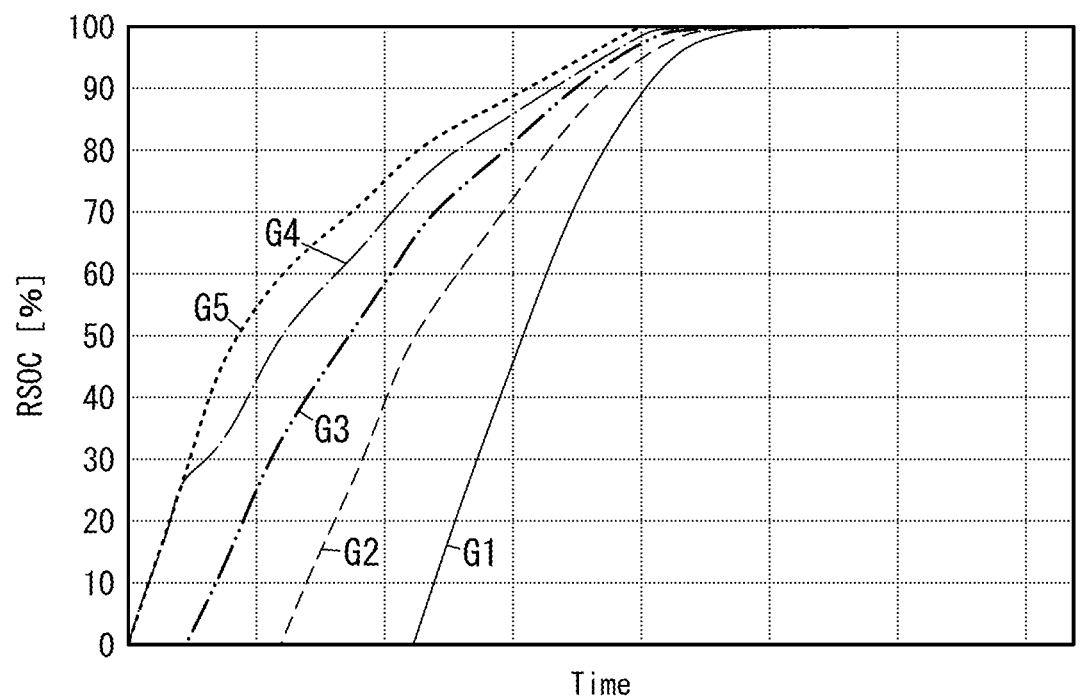
FIG. 10B is a graph showing a simulation result when the number adjusting process is applied to the charging system.

FIGS. 10A and 10B are graphs showing simulation results of cases where the above-described number adjusting process is applied and it is not applied. In FIGS. 10A and 10B, respective charging states of the first to fifth shopping baskets 2 are represented by G1 to G5, respectively, where each horizontal axis represents a time axis, and each vertical axis represents a relative remaining capacity.

That is, when the number adjusting process is not applied, the allowable number is fixed to, for example two and therefore charging is always performed two by two. In this case, as shown in FIG. 10A, charging of each of the fifth, fourth, third, second and first shopping baskets 2 is completed sequentially. On the other hands, when the number adjusting process is applied, the allowable number is increased from two to three, for example if the fifth shopping basket 2 is almost fully charged. As a result, as shown in FIG. 10B, while charging of each of the fifth, fourth, third, second and first shopping baskets 2 is completed sequentially, the time required until charging of the first shopping basket 2 is completed is shortened.

(3.5) Judgment Condition Changing Algorithm

The changer 115 is configured to change the judgment condition according to, for example a store situation. For example, the use of shopping baskets 2 in a store situation whose store is in "busy state" where the number of customers is relatively large with the inside of the store being crowded may be different from the use of shopping baskets 2 in a store situation whose store is in "slack state" where the number of customers is relatively small with the inside of the store being not crowded. Therefore, the charging system 10 changes the judgment condition according to the store situation and charges the shopping baskets 2 according to the use of the shopping baskets 2, thereby making it possible to efficiently charge the shopping baskets 2. However, since the store situation differs between stores, it is preferable that the algorithm for changing the judgment condition by the changer 115 is not fixed but automatically updated by machine learning.

As an example, when the store situation is classified into "busy state" where the number of customers is relatively large or "slack state" where the number of customers is relatively small, it is possible to estimate the store situation according to a frequency of use of the shopping baskets 2. That is, when respective frequencies of use of the shopping baskets 2 are larger than a specified value, it is estimated that the store situation is "busy state", while when the respective frequencies of use of the shopping baskets 2 are smaller than the specified value, it is estimated that the store situation is "slack state". The shopping baskets 2 are used uniformly in "busy state", while several shopping baskets 2 from the top in the charging target group 200 are used intensively in "slack state".

Therefore, the changer 115 is configured to change the judgment condition based on, for example frequency information representing a frequency of use of each of the shopping baskets 2. The "frequency of use" stated herein means a frequency at which a corresponding shopping basket 2 is used. Specifically, the time during which the shopping basket 2 is used for a certain period of time (for example, one hour), that is, the occupation ratio of the time when the shopping basket 2 is taken out from the charging target group 200 is used as the frequency information. Alternatively, the number of times the shopping basket 2 is used in a certain period, that is, the number of times it is taken out from the charging target group 200 in the certain period may be used as the frequency information.

Herein, the changer 115 changes the judgment condition based on, for example frequency information for each piece of identification information unique to every shopping basket 2. In this case, the changer 115 associates frequency information representing a frequency of use of each shopping basket 2 with identification information unique to the shopping basket 2 in a one-to-one correspondence and then stores, in the storage device 14, frequency information for each piece of identification information, thereby associating the shopping baskets 2 with their respective pieces of frequency information. The changer 115 statistically analyzes frequency information for every shopping basket 2 used in the store and changes the judgment condition according to an analysis result (for example, how many minutes are used per hour). This enables changing of the judgment condition according to the store situation.

The changer 115 changes the judgment condition by changing, to a calculation method to be applied, from "Multiplication method 1", "Multiplication method 2", "Addition method 1" and "Addition method 2" exemplified in "(3.3) Priority determining algorithm". For example, in "busy state" where the shopping baskets 2 are used uniformly, the changer 115 employs "Multiplication method 1" as the judgment condition. Accordingly, battery and position points equally contribute to a corresponding evaluation point and the shopping baskets 2 are charged uniformly. On the other hand, in "slack state" where several shopping baskets 2 from the top in the charging target group 200 are used intensively, the changer 115 employs "Addition method 2" as the judgment condition. Accordingly, each position point is more dominant in contribution to a corresponding evaluation point than a corresponding battery point, and several shopping baskets 2 from the top in the charging target group 200 are charged intensively.

The changer 115 may be configured to change the judgment condition based on frequency information for not each piece of identification information but each of the positions. In this case, the changer 115 associates frequency information representing a frequency of use of each shopping basket 2 with position information of a corresponding shopping basket 2 in a one-to-one correspondence and then stores, in the storage device 14, frequency information for each piece of position information, thereby associating the shopping baskets 2 with their respective pieces of position information. The changer 115 statistically analyzes frequency information for every shopping basket 2 contained in the charging target group 200 and changes the judgment condition according to an analysis result (for example, how many minutes are used per hour).

The changer 115 may be configured to change the judgment condition according to the time in place of frequency information or in addition to frequency information. The "time" stated herein may be periods divided along the time axis, and examples thereof include time interval, day of the week, month, season etc. For example, a time interval during which the store situation is "busy state" and a time interval when it is "slack state" are largely determined by the store. The changer 115 changes the judgment condition according to the time, thereby making it possible to change the judgment condition according to the store situation. Specifically, during a time interval corresponding to "busy state" where the shopping baskets 2 are used uniformly, the changer 115 employs "Multiplication method 1" as the judgment condition. On the other hand, during a time interval corresponding to "slack state" where several shopping baskets 2 from the top in the charging target group 200 are used intensively, the changer 115 employs "Addition method 2" as the judgment condition.

When the judgment condition is changed according to the time, the judgment condition may be changed so that charging of each of shopping baskets 2 not used in "slack state" such as, for example the first shopping basket 2 is completed by the time interval corresponding to "busy state". That is, since charging of each of the shopping basket 2 not used in "slack state" needs to be completed by the time interval corresponding to "busy state", it is possible to preferentially charge other shopping baskets 2 during a time interval corresponding to "slack state".

The changer 115 may be configured to change the judgment condition according to, after one use of each shopping basket 2, a reduction amount in a remaining capacity of a corresponding secondary battery 21 in place of frequency information or in addition to frequency information or frequency information and the time. For example, larger stores tend to take time to visit the store, so that the reduction amount in the remaining capacity of the secondary battery 21 in one use of each shopping basket 2 increases. The changer 115 therefore changes the judgment condition according to, after one use of each shopping basket 2, a reduction amount in a remaining capacity of a corresponding secondary battery 21, thereby making it possible to change the judgment condition according to the store situation. Specifically, when the reduction amount in the remaining capacity of each secondary battery 21 is larger than a predetermined value, the changer 115 employs "Multiplication method 1" as the judgment condition because the shopping baskets 2 are used uniformly. On the other hand, when the reduction amount in the remaining capacity of each secondary battery 21 is smaller than the predetermined value, the changer 115 employs "Addition method 2" as the judgment condition because several shopping baskets 2 from the top in the charging target group 200 are used intensively.

(4) Modified Examples

The abovementioned embodiment is merely one example of the present invention. Thus, the present invention is not limited to the embodiment, but various modifications are possible in light of general arrangement and the like and may be made regardless of the embodiment without departing from the scope of technical ideas according to the present invention.

(4.1) First Modified Example

In a charging system 10 in accordance with a first modified example of the embodiment, a judgment condition includes a target value of a remaining capacity of each of secondary batteries 21.

That is, in the embodiment, the target value of the remaining capacity of each of the secondary batteries 21 is not set in particular but rendered 100 [%] uniformly. In contrast, in the first modified example, the target value of the remaining capacity of each of the secondary batteries 21 is allowed to be arbitrarily set. For example, the target value of the remaining capacity of each of the secondary batteries 21 may be arbitrarily set according to, for example an input signal from the input device 16.

In this case, a relative value of the remaining capacity with respect to the target value (achievement rate or the like) is obtained based on the judgment condition from battery information on the remaining capacity of each of the secondary batteries 21 (relative remaining capacity). For example, it is assumed that the target value of the remaining capacity of each of the secondary batteries 21 is set to 80[%]. In this case, when a remaining capacity of a secondary battery 21 (relative remaining capacity) is 56[%], an achievement rate of the remaining capacity with respect to the target value of 80[%] is 70[%]. When the remaining capacity of the secondary battery 21 (relative remaining capacity) is 80[%], the achievement rate of the remaining capacity with respect to the target value of 80[%] is 100[%].

In other words, this configuration enables the charging system 10 to determine respective priorities for charging of the shopping baskets 2 based on, as a reference, the target value of a remaining capacity of each of the secondary batteries 21. For examples, the charging system 10 lowers respective priorities of shopping baskets 2 whose secondary batteries 21 have their respective remaining capacities (relative remaining capacities) equal to or less than the target value, thereby making it possible to preferentially charge shopping baskets 2 whose secondary batteries 21 have their respective remaining capacities less than the target value.

(4.2) Second Modified Example

In a charging system 10 in accordance with a second modified example of the embodiment, a judgment condition includes an upper limit number of shopping baskets 2 constituting a charging target group 200.

That is, in the embodiment, an upper limit number of the shopping baskets 2 constituting the charging target group 200 is not set in particular. In contrast, in the second modified example, the upper limit number of the shopping baskets 2 constituting the charging target group 200 is allowed to be arbitrarily set. The upper limit number of the shopping baskets 2 constituting the charging target group 200 may be arbitrarily set according to, for example an input signal from the input device 16.

In this case, a relative position of each of the shopping baskets 2 with respect to the upper limit number is obtained based on the judgment condition from position information on a position of each of the shopping baskets 2 in the charging target group 200. For example, it is assumed that the upper limit number is set to ten. In this case, when position a piece of information represents a seventh shopping basket 2, a position of the shopping basket 2 relative to the upper limit number is represented by 70 [%]. When another piece of position information represents a tenth shopping basket 2, a position of the shopping basket 2 relative to the upper limit number is represented by 100[%].

In other words, this enables the charging system 10 to determine respective priorities for charging of each of the shopping baskets 2 based on, as a reference, the upper limit number of the shopping baskets 2 constituting the charging target group 200. For example, the charging system 10 lowers respective priorities of shopping baskets 2 each of which has position information representing a position far from the upper limit number in the charging target group 200, thereby making it possible to preferentially charge shopping baskets 2 whose positions are close to the upper limit number.

(4.3) Third Modified Example

In a charging system 10 in accordance with a third modified example of the embodiment, shopping baskets 2 are electrically connected in parallel with a charging stand 1. Specifically, the charging stand 1 is provide with connection ports, and the shopping baskets 2 stacked up in a row are connected to the charging stand 1 so as to correspond one-to-one with the connection ports. Each of the shopping baskets 2 receives electric power from a corresponding connection port to charge its own secondary battery 21. In this case, it is preferable that the charging stand 1 and each of the shopping baskets 2 are configured so that the electric power is contactlessly transmitted like contactless power supply.

In this case, although each of the shopping baskets 2 may be provided with a charging circuit configured to charge its own secondary battery 21, each of the connection ports is also provided with such a charging circuit. The charging stand 1 accordingly enables a charge controller 114 to control each operation of the charging circuits of the connection ports, thereby controlling each output of the connection ports. Thus, the charge controller 114 directly controls charging of each of the shopping baskets 2.

Even in the present example, the shopping baskets 2 may be contained in components of the charging system 10, or not be contained in the components of the charging system 10.

(4.4) Other Modified Examples

Modified examples other than first, second and third modified examples will be listed below.

A charging system 10 of the present disclosure includes a computer system in, for example, the control circuit 11, the controller 24 and the like. The computer system includes, as main components, a processor and a memory as hardware. The processor executes a program stored in the memory of the computer system, thereby realizing functions as the charging system 10 of the present disclosure. The program may be not only stored in the memory of the computer system in advance but also provided via telecommunications network, or provided through a non-transitory computer readable medium such as a memory card, an optical disc, and a hard disc drive. The processor of the computer system is composed of one or more electronic circuits including a semiconductor integrated circuit (IC) or a large scale integrated circuit (LSI). The electronic circuits may be integrated in one chip or may be divided and dispersed in chips. The chips may be integrated in one device or may be dispersed in devices.

The electronic devices to be charged with the charging system 10 are not limited to the shopping baskets 2, but may be, for example, baskets used for purposes other than shopping, trays on which picked up goods are placed, shopping carts, and carts used in a facility such as an airport. Like the shopping baskets 2, the electronic device of each of the shopping carts includes a scanner configured to read goods information from each item of goods and a transmitter and receiver circuit configured to communicating with a store device, and constitutes a shopping assistance system along with the store device. The direction in which respective electronic devices of the shopping carts or the like overlap is not in a longitudinal direction (vertical direction) but a widthwise direction (horizontal direction). Basically, in the shopping carts and the like, a handling method in a state of being stacked in a row is a Last In First Out (LIFO) method like the shopping baskets.

However, in electronic devices of the shopping baskets 2 or the shopping carts and the like, a handling method in a state of being stacked in a row may be a First In First Out (FIFO) method. In this case, for example, if each of the shopping carts is stacked in order from the left, the shopping cart after use is returned to the right end of a charging target group 200 and the shopping cart to be used is taken out from the left end of the charging target group 200. The charging system 10 of the embodiment is applicable to charging of each of electronic devices handled by the First In First Out method. It is preferable that this case is different in assigning priorities from the Last In First Out method.

The position information may be information that indicates a position of a corresponding shopping basket 2 in the charging target group 200 in a state where the shopping baskets 2 are stacked in a row, and is not limited to the example in which each address used for communication between the charging stand 1 and a corresponding shopping basket 2 doubles as position information thereof.

Whether or not to enable the communication function of each communication circuit 23 of the shopping baskets 2 is not limited to a configuration in which it is determined based on the input state of the terminal for detection of the enabling signal Si1, but the communication function of each communication circuit 23 may be enabled when a state in which a corresponding shopping basket 2 is stacked is detected. For example, whether or not the communication function of each communication circuit 23 of the shopping baskets 2 is enabled may be determined through an input state of the terminals for communication, a magnet switch or the like.

A configuration in which the functions provided in the charging stand 1 is consolidated in one housing is not essential for the charging system 10. Components of charging stand 1 may be dispersed in housings. For example, the connector 17 and the power supply device 13 in the charging stand 1 may be provided in separate housings. In this case, the control circuit 11 and the like may be provided in the housing for the connector 17 or the housing for the power supply device 13. As another example, the charge controller 114 is not limited to the charging stand 1, but may be dispersed and provided in shopping baskets 2. The function of at least a part of the charging system 10 may be realized by, for example, a server system, a cloud (cloud computing) or the like.

Battery information acquired through the first receiver 111 is not limited to the relative state of charge (RSOC), but may be the remaining capacity (RC) of a corresponding secondary battery 21. For example, when respective full charge capacities (FCC) of secondary batteries 21 decrease due to degradation of each of the secondary batteries 21, the full charge capacities (FCC) may vary for each of the shopping baskets 2. In such a case, even if respective relative states of charge (RSOC) are the same, respective remaining capacities (RC) may differ for each of the shopping baskets 2 and waste time of each secondary battery 21 (available time of shopping basket 2) may differ. Therefore, when the full charge capacities (FCC) vary for each of the shopping baskets 2, using the remaining capacities (RC) as absolute values for determination of priorities by the determining processor 113, thereby reducing the influence, on the priorities, of variations in the full charge capacities (FCC).

The changer 115 is not essential for the configuration of the charging system 10, but may be omitted as appropriate.

The configuration in which the changer 115 changes the judgment condition based on frequency information representing a frequency of use of each of the shopping baskets 2 is not essential for the charging system 10, but may be omitted as appropriate. That is, the changer 115 does not necessarily use frequency information for changing the judgment condition. Similarly, the configuration in which the changer 115 changes the judgment condition according to the time is not essential for the charging system 10, but may be omitted as appropriate. That is, the changer 115 does not necessarily use the time for changing the judgment condition. Similarly, the configuration in which the changer 115 changes the judgment condition according to a reduction amount in a remaining capacity of the secondary battery 21 after one use of each shopping basket 2 is not essential for the charging system 10, but may be omitted as appropriate. That is, the changer 115 does not necessarily use, for changing the judgment condition, a reduction amount in a remaining capacity of the secondary battery 21 after one use of each shopping basket 2.

The judgment condition that includes combination of corresponding battery information and position information and weighting of each piece of corresponding battery information and position information is not essential for the configuration of the charging system 10. The judgment condition may include only one of; combination of corresponding battery information and position information; and weighting of each piece of corresponding battery information and position information. The judgment condition may include neither combination of corresponding battery information and position information nor weighting of each piece of corresponding battery information and position information.

Each of shopping baskets 2 may include at least one secondary battery 21, or at least part of the shopping baskets 2 may include secondary batteries 21.

Various modified examples described above may be appropriately combined and applied.

(5) Effects

As described above, a charging system (10) in accordance with a first aspect of the present invention is configured to charge a charging target group (200) including electronic devices (shopping baskets 2) which are stacked in a row and each of which includes a secondary battery (21). The charging system (10) includes a first receiver (111), a second receiver (112), a determining processor (113), and a charge controller (114). The first receiver (111) is configured to acquire, from the electronic devices, pieces of battery information representing remaining capacities of the secondary batteries (21), respectively. The second receiver (112) is configured to obtain, from the electronic devices, pieces of position information representing positions of the electronic devices in the charging target group, respectively. The determining processor (113) is configured to determine respective priorities of the electronic devices according to the pieces of battery information and the pieces of position information based on a judgment condition. The charge controller (114) is configured to control charging of each of the electronic devices so that the electronic devices are charged according to the respective priorities.

With this configuration, the charging system (10) charges the electronic devices with the electronic devices (shopping baskets 2) stacked in a row, thereby enabling one power supply facility (charging stand 1) to charge the electronic devices. The occupied area of the space (basket area) for charging can also be kept small. When charging the electronic devices stacked in a row, the charging system (10) determines the respective priorities of the electronic devices based on respective remaining capacities of the secondary batteries (21) and respective positions of the electronic devices in the charging target group (200), and charges the electronic devices according to the respective priorities. For this reason, the charging system (10) increases respective priorities of one or more electronic devices used intensively while distributing electric power from a relatively small capacity power supply facility to the electronic devices, thereby making it possible to suppress the shortage of respective remaining capacities of secondary batteries (21) of specific electronic devices. The charging system (10) consequently enables the relatively small capacity power supply facility to charge the electronic devices.

A charging system (10) in accordance with a second aspect of the present invention according to the first aspect further includes a changer (115) configured to change the judgment condition.

With this configuration, the judgment condition for the determining processor (113) is fixed but appropriately changed through the changer (115). It is accordingly possible to efficiently change the electronic devices.

In a charging system (10) in accordance with a third aspect of the present invention according to the second aspect, the changer (115) is configured to change the judgment condition based on pieces of frequency information representing frequencies of use of the electronic devices, respectively.

This configuration enables more efficient charging of the electronic devices by, for example, uniformly charging the electronic devices when the respective frequencies of use of the electronic devices are high, and intensively charging one or more electronic devices in a specific position range when the respective frequencies of use are low.

In a charging system (10) in accordance with a fourth aspect of the present invention according to the third aspect, the changer (115) is configured to change the judgment condition based on pieces of frequency information associated with pieces of identification information unique to the electronic devices, respectively.

With this configuration, the pieces of frequency information for changing the judgment condition are found with respect to the respective pieces of identification information unique to the electronic devices. This therefore enables the changer (115) to change the judgment condition based on the respective frequencies of use with respect to the electronic devices regardless of each position in the charging target group (200).

In a charging system (10) in accordance with a fifth aspect of the present invention according to the third aspect, the changer (115) is configured to change the judgment condition based on the pieces of frequency information associated with the pieces of position information, respectively.

With this configuration, the pieces of frequency information for changing the judgment condition are found with respect to not the respective pieces of identification information unique to the electronic devices but the respective pieces of position information. This therefore enables the changer (115) to change the judgment condition based on the pieces of frequency information of the electronic devices with respect to respective positions in the charging target group (200).

In a charging system (10) in accordance with a sixth aspect of the present invention according to any of the second to fifth aspects, the changer (115) is configured to change the judgment condition according to time.

This configuration enables more efficient charging of the electronic devices by, for example, uniformly charging the electronic devices when the respective frequencies of use of the electronic devices are high, and intensively charging one or more electronic devices in a specific position range when the respective frequencies of use are low.

In a charging system (10) in accordance with a seventh aspect of the present invention according to any of the second to sixth aspects, the changer (115) is configured to change the judgment condition according to reduction amounts of remaining capacities of the secondary batteries (21) after one use of the electronic devices, respectively.

This configuration enables more efficient charging of the electronic devices by, for example, uniformly charging the electronic devices when the respective reduction amounts of the remaining capacities are larger than a predetermined value, and intensively charging one or more electronic devices in a specific position range when the respective reduction amounts of the remaining capacities are smaller than the predetermined value.

In a charging system (10) in accordance with an eighth aspect of the present invention according to any of the first to seventh aspects, the judgment condition includes at least one of: combination of corresponding battery information and position information; and weighting of each piece of the corresponding battery information and position information.

This configuration enables the determining processor (113) to perform combination of the respective pieces of battery information and the respective pieces of position information or weighing thereof, thereby setting different priorities even from the same battery information and position information.

In a charging system (10) in accordance with a ninth aspect of the present invention according to the eighth aspect, ways of the combination of corresponding battery information and position information include: multiplication of a battery point and a position point represented as scores of the corresponding battery information and position information, respectively; and addition of the battery point and the position point represented as the scores of the corresponding battery information and position information, respectively.

This configuration enables the determining processor (113) to, for example, multiply or add corresponding battery and position points, thereby rendering a corresponding priority different from each other even from the same battery information and position information.

In a charging system (10) in accordance with a tenth aspect of the present invention according to any of the first to ninth aspects, the judgment condition includes a target value of the remaining capacities of the secondary batteries.

This configuration causes one or more electronic devices, of which secondary batteries (21) have their respective remaining capacities that are greater than or equal to the target value, to have their respective low priorities, thereby making it possible to preferentially charge one or more electronic devices whose secondary batteries (21) have their respective remaining capacities that are less than the target value.

In a charging system (10) in accordance with an eleventh aspect of the present invention according to any of the first to tenth aspects, the judgment condition includes an upper limit number of the electronic devices constituting the charging target group.

For example, this configuration causes one or more electronic devices, of which positions in the charging target group (200) are far from the upper limit number, to have their respective low priorities, thereby making it possible to preferentially charge one or more electronic devices whose positions therein are close to the upper limit number.

REFERENCE SIGNS LIST

1 Charging stand
2, 201 to 206 Shopping basket (electronic device)
10 Charging system
21 Secondary battery
111 First receiver
112 Second receiver
113 Determining processor
114 Charge controller
115 Changer
116 Address provider
200 Charging target group

What is claimed is:

1. A charging system, configured to charge a charging target group including electronic devices which are stacked in a row and include their respective secondary batteries, wherein the charging system comprises
a first receiver configured to acquire, from the electronic devices, pieces of battery information representing remaining capacities of the secondary batteries, respectively,
a second receiver configured to obtain, from the electronic devices, pieces of position information representing positions of the electronic devices in the charging target group, respectively,
a determining processor configured to determine respective priorities of the electronic devices according to the pieces of battery information and the pieces of position information based on a judgment condition, and
a charge controller configured to control charging of each of the electronic devices so that the electronic devices are charged according to the respective priorities.

2. The charging system of claim 1, further comprising a changer configured to change the judgment condition.

3. The charging system of claim 2, wherein the changer is configured to change the judgment condition based on pieces of frequency information representing frequencies of use of the electronic devices, respectively.

4. The charging system of claim 3, wherein the changer is configured to change the judgment condition based on pieces of frequency information associated with pieces of identification information unique to the electronic devices, respectively.

5. The charging system of claim 3, wherein the changer is configured to change the judgment condition based on the pieces of frequency information associated with the pieces of position information, respectively.

6. The charging system of claim 2, wherein the changer is configured to change the judgment condition according to time.

7. The charging system of claim 2, wherein the changer is configured to change the judgment condition according to reduction amounts of remaining capacities of the secondary batteries after one use of the electronic devices, respectively.

8. The charging system of claim 1, wherein the judgment condition includes at least one of: combination of corresponding battery information and position information; and weighting of each piece of the corresponding battery information and position information.

9. The charging system of claim 8, wherein ways of the combination of corresponding battery information and position information includes: multiplication of a battery point and a position point represented as scores of the corresponding battery information and position information, respectively; and addition of the battery point and the position point represented as the scores of the corresponding battery information and position information, respectively.

10. The charging system of claim 1, wherein the judgment condition includes a target value of the remaining capacities of the secondary batteries.

11. The charging system of claim 1, wherein the judgment condition includes an upper limit number of the electronic devices constituting the charging target group.

* * * * *